US012748539B2

(12) United States Patent
Thoppil et al.

(10) Patent No.: US 12,748,539 B2
(45) Date of Patent: Sep. 29, 2026

(54) AUTOMATIC SPACE SHARING OF DISAGGREGATED STORAGE OF A STORAGE POD BY MULTIPLE NODES OF A DISTRIBUTED STORAGE SYSTEM

(71) Applicant: NetApp, Inc., San Jose, CA (US)

(72) Inventors: Anil Paul Thoppil, Pleasanton, CA (US); Ananthan Subramanian, San Ramon, CA (US); Suhas Urkude, San Ramon, CA (US); Arindam Banerjee, Pleasanton, CA (US); Richard Parvin Jernigan, IV, Sewickley, PA (US)

(73) Assignee: NetApp, Inc., San Jose, CA (US)

( * ) Notice: Subject to any disclaimer, the term of this patent is extended or adjusted under 35 U.S.C. 154(b) by 187 days.

(21) Appl. No.: 18/595,785

(22) Filed: Mar. 5, 2024

(65) Prior Publication Data

US 2025/0284417 A1 Sep. 11, 2025

(51) Int. Cl.
*G06F 3/00* (2006.01)
*G06F 3/06* (2006.01)

(52) U.S. Cl.
CPC .......... *G06F 3/0631* (2013.01); *G06F 3/0604* (2013.01); *G06F 3/0689* (2013.01)

(58) Field of Classification Search
CPC ..... G06F 3/0604; G06F 3/0631; G06F 3/0689
See application file for complete search history.

(56) References Cited

U.S. PATENT DOCUMENTS

| | | | |
|---|---|---|---|
| 6,189,015 | B1 | 2/2001 | Reed et al. |
| 7,409,511 | B2 | 8/2008 | Edwards et al. |
| 7,730,277 | B1 | 6/2010 | Prakash et al. |
| 7,958,168 | B2 | 6/2011 | Chen et al. |
| 7,979,402 | B1 | 7/2011 | Hamilton et al. |

(Continued)

FOREIGN PATENT DOCUMENTS

| | | | |
|---|---|---|---|
| EP | 1369772 | A2 | 12/2003 |
| WO | 2021050875 | A1 | 3/2021 |

OTHER PUBLICATIONS

Vast., "Universal Storage Explained," An E-White Paper, Feb. 12, 2024, 222 pages.

(Continued)

*Primary Examiner* — Craig S Goldschmidt
(74) *Attorney, Agent, or Firm* — Jaffery Watson Hamilton & DeSanctis LLP

(57) ABSTRACT

Systems and methods are provided for implementation and use of disaggregated storage by a distributed storage system. In various examples described herein, the association of blocks of storage space within a storage pod with a given dynamically extensible file system (DEFS) may be in large chunks of one or more gigabytes (GB), which may be referred to herein as "allocation areas" (AAs) that each include multiple RAID stripes. The use of large, multi-GB chunks, as the unit of space allocation/assignment to DEFSs of a distributed storage system facilitates ease of management and independence of write allocation. The use of AAs described herein further allows disk space to be used more fluidly across individual (nodes) storage systems of a distributed storage system (cluster of nodes working together), thereby eliminating silos of storage; and processing resource (e.g., CPU) load may be distributed across the cluster.

18 Claims, 13 Drawing Sheets

(56) References Cited

U.S. PATENT DOCUMENTS 8,005,793 B1 8/2011 Jernigan, IV
8,086,603 B2 12/2011 Nasre et al.
8,095,730 B1 1/2012 Jiang et al.
8,200,630 B1 6/2012 Park et al.
8,671,265 B2 3/2014 Wright
8,671,445 B1 3/2014 Wang et al.
8,812,450 B1 8/2014 Kesavan et al.
8,832,363 B1 9/2014 Sundaram et al.
8,903,761 B1 12/2014 Zayas et al.
8,903,830 B2 12/2014 Edwards
9,003,021 B2 4/2015 Wright et al.
9,122,398 B2 9/2015 Gupta et al.
9,407,433 B1 8/2016 Sohi et al.
9,846,539 B2 12/2017 Babu et al.
10,311,019 B1 6/2019 Vijendra et al.
10,365,983 B1 7/2019 Foley et al.
10,430,279 B1 10/2019 Dittia et al.
10,459,806 B1 10/2019 He et al.
10,810,054 B1* 10/2020 Martinez Lerin ....... G06F 3/067
10,970,259 B1 4/2021 Bono et al.
11,023,133 B2 6/2021 Beloussov et al.
11,175,984 B1 11/2021 Lercari et al.
11,341,099 B1 5/2022 Wolfson et al.
11,755,627 B1 9/2023 Puente et al.
11,868,656 B2 1/2024 Dronamraju et al.
12,204,784 B1 1/2025 Thoppil et al.
2001/0042221 A1* 11/2001 Moulton ................. G06F 3/067 714/5.11
2002/0133512 A1 9/2002 Milillo et al.
2003/0093509 A1* 5/2003 Li ......................... H04L 67/564 709/223
2004/0015655 A1 1/2004 Willis et al.
2005/0114594 A1 5/2005 Corbett et al.
2005/0246401 A1 11/2005 Edwards et al.
2006/0036602 A1 2/2006 Unangst et al.
2006/0253856 A1* 11/2006 Hu .......................... G06F 9/526 718/104
2007/0174673 A1 7/2007 Kawaguchi et al.
2008/0071906 A1 3/2008 Thoennes et al.
2008/0154984 A1 6/2008 Andrews et al.
2010/0070764 A1 3/2010 Ishii et al.
2011/0202705 A1 8/2011 Hayashi et al.
2011/0302358 A1 12/2011 Yu et al.
2012/0023385 A1 1/2012 Scouarnec et al.
2012/0089797 A1 4/2012 Shibayama et al.
2012/0278382 A1 11/2012 Faith et al.
2012/0310892 A1 12/2012 Dam et al.
2013/0227145 A1 8/2013 Wright et al.
2014/0025909 A1* 1/2014 Naor ....................... G06F 3/067 711/162
2014/0122636 A1* 5/2014 Peake ................. G06F 21/6218 709/213
2014/0237321 A1 8/2014 Gold
2015/0244795 A1 8/2015 Cantwell et al.
2016/0105311 A1 4/2016 Thakkar et al.
2016/0202935 A1 7/2016 Hoch et al.
2016/0350358 A1 12/2016 Patel et al.
2017/0026263 A1 1/2017 Gell et al.
2018/0131749 A1 5/2018 Dobrenko et al.
2018/0314725 A1 11/2018 Subramanian et al.
2019/0114117 A1* 4/2019 Patel ....................... G06F 3/065
2019/0147069 A1 5/2019 Ben Dayan et al.
2020/0089420 A1 3/2020 Sharoni et al.
2020/0097404 A1 3/2020 Cason
2020/0117362 A1 4/2020 McCarthy et al.
2020/0117372 A1 4/2020 Corey et al.
2020/0136943 A1 4/2020 Banyai et al.
2021/0011640 A1 1/2021 Hua et al.
2021/0081292 A1 3/2021 Jmt et al.
2021/0081352 A1 3/2021 Yang et al.
2021/0124645 A1 4/2021 Chinthekindi et al.
2021/0349853 A1 11/2021 Duttagupta et al.
2021/0349859 A1 11/2021 Bafna et al.
2022/0137847 A1 5/2022 Roche et al.
2022/0197532 A1 6/2022 Muthiah et al.
2022/0222002 A1* 7/2022 Danilov ................ G06F 3/0619
2022/0308794 A1 9/2022 Fukatani et al.
2022/0391359 A1 12/2022 Dronamraju et al.
2022/0391361 A1 12/2022 Subramanian et al.
2023/0121460 A1 4/2023 Banerjee et al.
2023/0152986 A1 5/2023 Sun et al.
2023/0367517 A1 11/2023 Dronamraju et al.
2023/0367746 A1 11/2023 Dronamraju et al.
2023/0393787 A1 12/2023 Dronamraju et al.
2024/0143233 A1 5/2024 Dronamraju et al.
2025/0284424 A1 9/2025 Curtis-Maury et al.
2025/0284425 A1 9/2025 Thoppil et al.
2025/0284427 A1 9/2025 Thoppil et al.
2025/0284628 A1 9/2025 Natarajan et al.
2025/0284662 A1 9/2025 Krishnamoorthy et al.
2025/0284663 A1 9/2025 Thoppil et al.

OTHER PUBLICATIONS

Final Office Action mailed on Jul. 3, 2025 for U.S. Appl. No. 18/595,768, filed Mar. 5, 2024, 18 pages.
Non-Final Office Action mailed on Dec. 19, 2024 for U.S. Appl. No. 18/595,768, filed Mar. 5, 2024, 14 pages.
Containers as a Service. Bring Data Rich Enterprise Applications to your Kubernetes Platform [online]. Portworx, Inc. 2021,8 pages [retrieved on Nov. 9, 2021]. Retrieved from the Internet: https://portworx.com/containers-as-a-service/.
Containers vs. Microservices: What's the Difference? [online]. BMC, 2021, 19 pages [retrieved on Nov. 9, 2021]. Retrieved from the Internet: https://www.bmc.com/blogs/containers-vs-microservices/.
Docker vs Virtual Machines (VMs): A Practical Guide to Docker Containers and VMs [online]. Jan. 16, 2020. Weaveworks, 2021, 8 pages, [retrieved on Nov. 9, 2021]. Retrieved from the Internet: https://www.weave.works/blog/a-practical-guide-to-choosing-between-docker-containers-and-vms.
Extended European Search Report for Application No. EP22177676 mailed on Nov. 10, 2022, 10 pages.
GitHub., "Stork—Storage Orchestration Runtime for Kubernetes," Libopenstorage/Stork, 2022, pp. 1-14. Retrieved from the Internet: https://github.com/libopenstorage/stork.
Joshi A., "From there to here, from here to there, Containers are Everywhere!," Dec. 16, 2020 [online], Nutanix. Dev, 2021, 14 pages. [Retrieved on Nov. 9, 2021], Retrieved from the Internet: URL: https://www.nutanix.dev/2020/12/16/from-there-to-here-from-here-to-there-containers-are-everywhere/.
Karbon Kubernetes Orchestration. Management Made Simple, [online]. Nutanix, 2021, 12 pages [Retrieved on Nov. 9, 2021]. Retrieved from the Internet: https://www.nutanix.com/products/karbon.
Kralj M., "How to Orchestrate the Modern Cloud with Kubernetes," Jul. 2020, Software Engineering Blog, Retrieved from the Internet at: https://www.accenture.com/us-en/blogs/software-engineering-blog/kralj-orchestrate-modern-cloud-kubernetes, 7 pages.
Kubernetes., "Production-Grade Container Orchestration," 2021, 6 pages. Retrieved from the Internet: [https://kubernetes.io/].
NetApp SolidFire Element OS User Guide for Element OS Version 10.0, Sep. 2017, 215-12504_A0, 160 pages.
Non-Final Office Action mailed on Dec. 7, 2023 for U.S. Appl. No. 17/449,760, filed Oct. 1, 2021, 10 pages.
Non-Final Office Action mailed on Mar. 15, 2023 for U.S. Appl. No. 17/449,753, filed Oct. 1, 2021, 8 pages.
Non-Final Office Action mailed on Oct. 30, 2023 for U.S. Appl. No. 18/047,774, filed Oct. 19, 2022, 8 pages.
Notice of Allowance mailed on Apr. 8, 2024 for U.S. Appl. No. 18/359,192, filed Jul. 26, 2023, 08 pages.
Notice of Allowance mailed on Apr. 24, 2024 for U.S. Appl. No. 18/047,774, filed Oct. 19, 2022, 09 pages.
Notice of Allowance mailed on Aug. 31, 2023 for U.S. Appl. No. 17/449,753, filed Oct. 1, 2021, 7 pages.
Notice of Allowance mailed on Mar. 13, 2024 for U.S. Appl. No. 17/449,758, filed Oct. 1, 2021, 08 pages.

(56) References Cited

OTHER PUBLICATIONS

Notice of Allowance mailed on Nov. 8, 2023 for U.S. Appl. No. 17/449,758, filed Oct. 1, 2021, 8 pages.
Ontap 9, Concepts, Jun. 2021,215-11959_2021-06_en-us, 38 pages.
Ontap 9, Disks and Aggregates Power Guide, Jul. 2021,215-11204_2021-07_en-us, 54 pages.
Ontap 9, Replication between NetApp Element Software and Ontap, May 2021, 215-12645_2021-05_en-us, 23 pages.
Ontap 9, System Administration Reference, Jul. 2021, 15-11148_2021-07_en-us, 150 pages.
Pods [online]. Kubernetes, 2021, 6 pages [retrieved on Nov. 9, 2021]. Retrieved from the Internet: https://kubernetes.io/docs/concepts/workloads/pods/.
Portworx Data Services, the Complete Solution for Deploying Production-Grade Data Services on Kubernetes. [online]. Portworx, Inc. 2021,5 pages. [Retrieved on Nov. 9, 2021]. Retrieved from the Internet: https://portworx.com/products/portworx-data-services/.
Portworx Enterprise is the Complete Kubernetes Storage Platform Trusted in Production by the Global 2000 [online]. Portworx, Inc. 2021, 10 pages [Retrieved on Nov. 9, 2021]. Retrieved from the Internet: https://portworx.com/products/portworx-enterprise/.
Portworx., "Guarantee Your Cloud Native Success with the Portworx Data Services Platform for Kubernetes," Pure Storage, 2 pages. Retrieved from the Internet: https://portworx.com/platform/.
Portworx., "Portworx Releases STORK, An Open-Source Kubernetes Scheduler Extender to Add Additional Capabilities for Stateful Applications in Production," GlobeNewswire, 2018, pp. 1-6. Retrieved from the Internet: https://www.globenewswire.com/en/news-release/2018/01/31/1329233/0/en-Additional-Capabilities-for-Stateful-Applications-in-Production.html.
Portwrox., "Introducing STORK: Intelligent Storage Orchestration for Kubernetes," STORK, 2018, pp. 1-10. Retrieved from the Internet: https://portworx.com/blog/stork-storage-orchestration-kubernetes/.
Restriction Requirement mailed Jun. 16, 2023 for U.S. Appl. No. 17/449,758, filed Oct. 1, 2021, 6 pages.
Sanglaji M., etal., "Nutanix Karbon: Enterprise-grade Kubernetes Solution," Nov. 28, 2018, 5 pages [online], [retrieved on Nov. 9, 2021]. Retrieved from the Internet: https://www.nutanix.com/blog/nutanix-karbon-enterprise-grade-kubernetes-solution.
Screen Captures from YouTube Video Clip Entitled "Pure Storage Portworx Deep Dive," 5 pages, Uploaded on Nov. 6, 2020 by User "Tech Field Day". Retrieved from the Internet: https://www.youtube.com/watch?v=WTCI98RAbZg.
Software Defined Storage (SDS) Solutions, [online]. Trustradius, 2021, 14 pages [Retrieved on Nov. 9, 2021]. Retrieved from the Internet: https://www.trustradius.com/software-defined-storage-sds.
Software-defined Storage, [online] IBM, 2021, 12 pages [retrieved on Nov. 9, 2021]. Retrieved from the Internet: https://www.ibm.com/it-infrastructure.
Solution Brief. Easily Operate a Database-as-a-Service Platform, [online], Portworx, Inc. 2021, 2 pages [retrieved on Nov. 9, 2021]. Retrieved from the Internet: https://portworx.com/wp-content/uploads/2021/09/pds-solution-brief.pdf.
Tanase C.D., "Portworx—Brief Introduction—k8s Persistent Storage, Mobility, Backup, DR Made Easier," Backup and Restore of Kubernetes Containers, 2021, pp. 1-5. Retrieved from the Internet: https://www.linkedin.com/pulse/portworx-brief-introduction-k8s-persistent-storage-dr-calin.
Weil S.A., et al., Ceph: A Scalable, High-performance Distributed File System. In Proceedings of the 7th Symposium on Operating Systems Design and Implementation (OSDI '06), USENIX Association, USA, 2006, pp. 307-320.
What Is Container Orchestration, Exactly? Everything to Know [online], LaunchDarkly, Apr. 28, 2021, 8 pages. [retrieved on Nov. 9, 2021]. Retrieved from the Internet: https://launchdarkly.com/blog/what-is-container-orchestration-exactly-everything/.
What is Container Orchestration? [online], CapitalOne, 2021, 8 pages [retrieved on Nov. 9, 2021], Retrieved from the Internet: https://www.capitalone.com/tech/cloud/what-is-container-orchestration/.
Non-Final Office Action mailed on Jul. 2, 2024 for U.S. Appl. No. 18/649,906, filed Apr. 29, 2024, 09 pages.
Notice of Allowance mailed on Sep. 18, 2024 for U.S. Appl. No. 18/649,906, filed Apr. 29, 2024, 08 pages.
International Search Report and Written Opinion for Application No. PCT/US2025/018334, mailed on May 9, 2025, 14 pages.
Non-Final Office Action mailed on Mar. 4, 2026 for U.S. Appl. No. 18/595,799, filed Mar. 5, 2024, 10 pages.
Non-Final Office Action mailed on Mar. 4, 2026 for U.S. Appl. No. 19/183,991, filed Apr. 21, 2025, 22 pages.
Notice of Allowance mailed on Apr. 15, 2026 for U.S. Appl. No. 18/595,768, filed Mar. 5, 2024, 13 pages.

* cited by examiner

AUTOMATIC SPACE SHARING OF DISAGGREGATED STORAGE OF A STORAGE POD BY MULTIPLE NODES OF A DISTRIBUTED STORAGE SYSTEM

BACKGROUND

Field

Various embodiments of the present disclosure generally relate to storage systems. In particular, some embodiments relate to the implementation and use of disaggregated storage space of a storage pod by a distributed storage system having a disaggregated storage architecture to, among other things, avoid silos of storage space associated with a given node of the cluster, enable independent file system operation on each node, accommodate addition/removal of nodes and/or disks on demand, and facilitate performance of data management features at distributed scale.

Description of the Related Art

Distributed storage systems generally take the form of a cluster of storage controllers (or nodes in virtual or physical form). As a result of sub-optimal infrastructure architectures, prior scale-out storage solutions do not effectively utilize all three vectors of infrastructure (i.e., compute, network, and storage). For example, as shown in FIG. 5, each node of a distributed storage system may be associated with a dedicated pool of storage space (e.g., a node-level aggregate representing a file system that holds one or more volumes created over one or more RAID groups and which is only accessible from a single node at a time), thereby creating storage silos.

SUMMARY

Systems and methods are described for implementation and use of disaggregated storage of a storage pod by a distributed storage system. According to one embodiment, a storage pod is provided having a group of disks containing multiple Redundant Array of Independent Disks (RAID) groups, wherein the storage pod is accessible concurrently to all nodes of multiple nodes of a cluster representing a distributed storage system via a global physical volume block number (PVBN) space. A node of the cluster monitors storage space availability or usage by one or more dynamically extensible file systems (DEFSs) of the node. Based on the storage space availability or usage meeting a predetermined or configurable threshold in relation to storage space availability or usage of one or more DEFSs of one or more other nodes of the multiple nodes of the cluster, the node may request ownership of one or more allocation areas (AA) within the global PVBN space currently owned by the one or more DEFSs of the one or more other nodes be transferred to the node.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
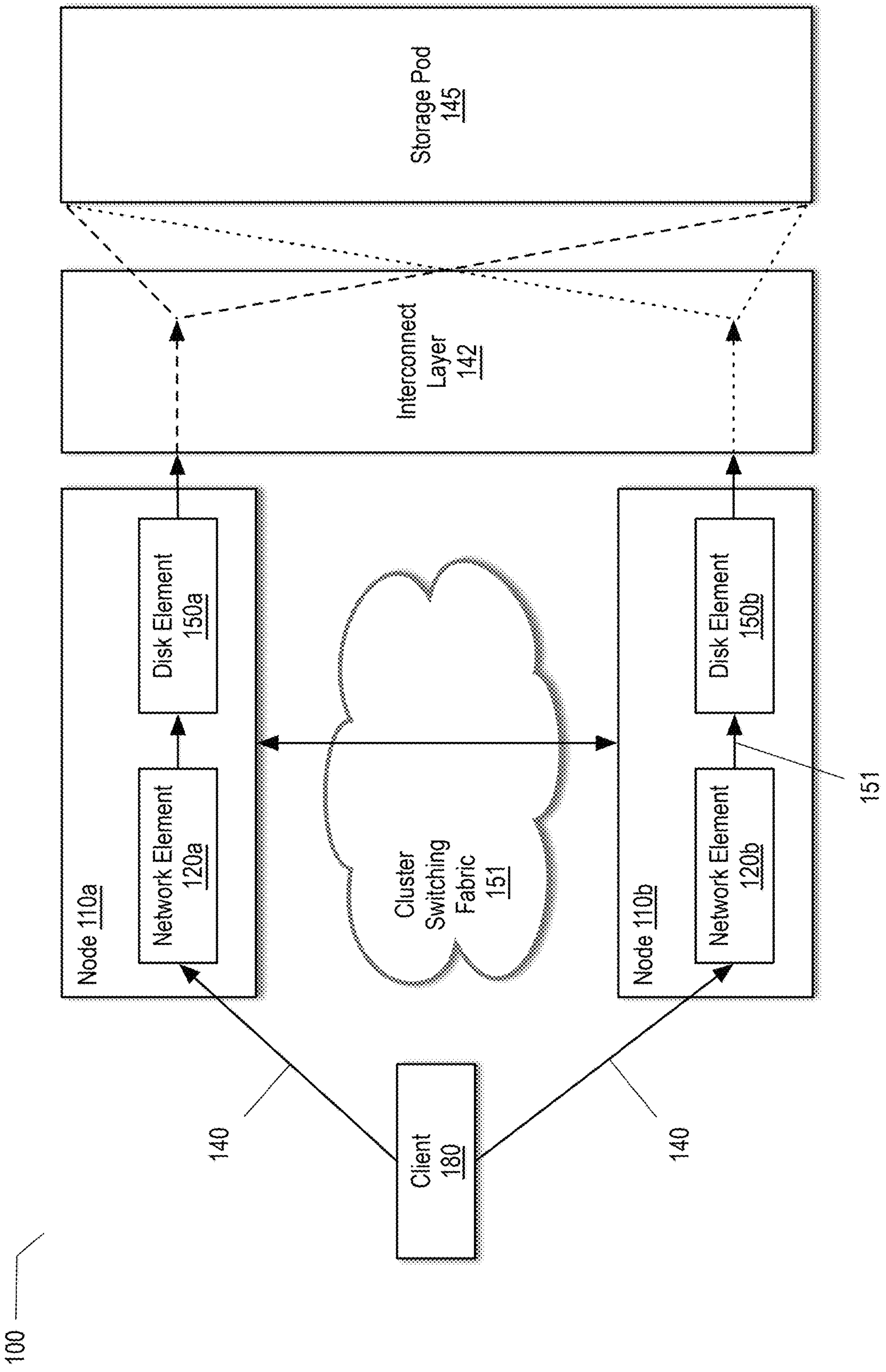
FIG. 1 is a block diagram illustrating a plurality of nodes interconnected as a cluster in accordance with an embodiment of the present disclosure.

Systems and methods are described for implementation and use of disaggregated storage of a storage pod by a distributed storage system. As compared to existing scale out storage solution architectures, various examples described herein facilitate various advantages, including, but not limited to, one or more of the following:

- Simplified management
- No silos of storage space
- Independent file system operation on each node of a cluster

- Independent scaling of performance and capacity (e.g., the ability to independently add nodes and/or disks on demand)
- Reduced internode (or "East-West") communications/traffic
- No additional redirection in the Input/Output (I/O) path
- No additional write amplification
- Integration with existing storage operating systems (e.g., the ONTAP data management software available from NetApp, Inc. of San Jose, CA).
- Distributed disk operations
- The ability to use all disks associated with a distributed storage system in a more uniform manner In various examples described herein, disk space may be used more fluidly across all the individual storage systems (e.g., nodes) of a distributed storage system (e.g., a cluster of nodes working together), thereby eliminating silos of storage; and processing resource (e.g., central processing unit (CPU)) load may be distributed across the cluster. The proposed architecture seeks to prevent a given disk from being tied to any single node of the cluster by introducing a new construct referred to herein as a "dynamically extensible file system," examples of which are described further below with reference to FIG. 6. In contrast to the entirety of a given storage device (e.g., a disk) being owned by a node-level aggregate and the aggregate file system being visible from only one node of a cluster as shown and described with reference to FIG. 5, the use of dynamically extensible file systems facilitates visibility by all nodes in the cluster to the entirety of a global physical volume block number (PVBN) space of the disks associated with a single "storage pod" (another new construct introduced herein) that may be shared by all of the nodes of the cluster with space from the global PVBN space being used on demand.

In one embodiment, each node of a cluster has access to do read and write to all the disks in a storage pod associated with a cluster. Given all the nodes have access to the same disks, a RAID subsystem or layer can now assimilate the same RAID tree from the same set of disks and present the global PVBN space to the file system (e.g., a write anywhere file system, such as the write anywhere file layout (WAFL) file system available from NetApp, Inc. of San Jose, CA). Using the global PVBN space, each node of the cluster can create an independent file system that it needs. As those skilled in the art will appreciate, it would be dangerous for each node to allocate from the same global PVBN space independently and without limitation. As such, examples of the proposed architecture restrict each dynamically extensible file system to use (consume) space only from the blocks assigned to it. As such, when performing writes, each dynamically extensible file system stays in its own lane without the need for complex access control mechanisms, such as locks.

As described further below, in some examples, the association of blocks to a dynamically extensible file system may be in large chunks of one or more gigabytes (GB), which are referred to herein as "allocation areas" (AAs) that each include multiple RAID stripes. The use of large, multi-GB chunks, as the unit of space allocation/assignment to dynamically extensible file systems facilitates case of management (e.g., by way of reducing the frequency of ownership transfers among dynamically extensible file systems) of these AAs. The assignment of AAs to individual dynamically extensible file systems, which in turn are owned by nodes, additionally helps each node do its write allocation independently since, by definition an entire RAID stripe is owned by a single dynamically extensible file system. In some embodiments, dynamically extensible file systems also minimize or at least significantly reduce the need for internode communications. For example, dynamically extensible file systems can limit their coordination across nodes to situations in which space balancing is to be performed (e.g., responsive to a node running low on free storage space relative to the other nodes), which is not a frequent operation. Responsive to a space balancing trigger event, a given dynamically extensible file system (or the node owning given dynamically extensible file system on behalf of the given dynamically extensible file system) may request space be reassigned to it from one or more other dynamically extensible file systems. The combination of visibility into the entire global PVBN space and the use of dynamically extensible file systems and their association with a given portion of the disaggregated storage of a storage pod to which a given dynamically extensible file system has exclusive write access enables each node to run independently most of the time.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider or hyperscaler (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds).

As used herein, a "storage system" or "storage appliance" generally refers to a type of computing appliance or node, in virtual or physical form, that provides data to, or manages data for, other computing devices or clients (e.g., applications). The storage system may be part of a cluster of multiple nodes representing a distributed storage system. In various examples described herein, a storage system may be run (e.g., on a VM or as a containerized instance, as the case may be) within a public cloud provider.

As used herein, the term "storage operating system" generally refers to computer-executable code operable on a computer to perform a storage function that manages data access and may, in the case of a storage system (e.g., a node), implement data access semantics of a general purpose operating system. The storage operating system can also be implemented as a microkernel, an application program operating over a general-purpose operating system, such as UNIX or Windows NT, or as a general-purpose operating system with configurable functionality, which is configured for storage applications as described herein. In some embodiments, a light-weight data adaptor may be deployed on one or more server or compute nodes added to a cluster to allow compute-intensive data services to be performed without adversely impacting performance of storage operations being performed by other nodes of the cluster. The light-weight data adaptor may be created based on a storage operating system but, since the server node will not participate in handling storage operations on behalf of clients, the light-weight data adaptor may exclude various subsystems/modules that are used solely for serving storage requests and that are unnecessary for performance of data services. In this manner, compute intensive data services may be handled within the cluster by one of more dedicated compute nodes.

As used herein, a "cloud volume" generally refers to persistent storage that is accessible to a virtual storage system by virtue of the persistent storage being associated with a compute instance in which the virtual storage system is running. A cloud volume may represent a hard-disk drive (HDD) or a solid-state drive (SSD) from a pool of storage devices within a cloud environment that is connected to the compute instance through Ethernet or fibre channel (FC) switches as is the case for network-attached storage (NAS) or a storage area network (SAN). Non-limiting examples of cloud volumes include various types of SSD volumes (e.g., AWS Elastic Block Store (EBS) gp2, gp3, io1, and io2 volumes for EC2 instances) and various types of HDD volumes (e.g., AWS EBS st1 and sc1 volumes for EC2 instances).

As used herein a "consistency point" or "CP" generally refers to the act of writing data to disk and updating active file system pointers. In various examples, when a file system of a storage system receives a write request, it commits the data to permanent storage before the request is confirmed to the writer. Otherwise, if the storage system were to experience a failure with data only in volatile memory, that data would be lost, and underlying file structures could become corrupted. Physical storage appliances commonly use battery-backed high-speed non-volatile random access memory (NVRAM) as a journaling storage media to journal writes and accelerate write performance while providing permanence, because writing to memory is much faster than writing to storage (e.g., disk). Storage systems may also implement a buffer cache in the form of an in-memory cache to cache data that is read from data storage media (e.g., local mass storage devices or a storage array associated with the storage system) as well as data modified by write requests. In this manner, in the event a subsequent access relates to data residing within the buffer cache, the data can be served from local, high performance, low latency storage, thereby improving overall performance of the storage system. Virtual storage appliances may use NV storage backed by cloud volumes in place of NVRAM for journaling storage and for the buffer cache. Regardless of whether NVRAM or NV storage is utilized, the modified data may be periodically (e.g., every few seconds) flushed to the data storage media. As the buffer cache may be limited in size, an additional cache level may be provided by a victim cache, typically implemented within a slower memory or storage device than utilized by the buffer cache, that stores data evicted from the buffer cache. The event of saving the modified data to the mass storage devices may be referred to as a CP. At a CP, the file system may save any data that was modified by write requests to persistent data storage media. As will be appreciated, when using a buffer cache, there is a small risk of a system failure occurring between CPs, causing the loss of data modified after the last CP. Consequently, the storage system may maintain an operation log or journal of certain storage operations within the journaling storage media that have been performed since the last CP. This log may include a separate journal entry (e.g., including an operation header) for each storage request received from a client that results in a modification to the file system or data. Such entries for a given file may include, for example, "Create File," "Write File Data," and the like. Depending upon the operating mode or configuration of the storage system, each journal entry may also include the data to be written according to the corresponding request. The journal may be used in the event of a failure to recover data that would otherwise be lost. For example, in the event of a failure, it may be possible to replay the journal to reconstruct the current state of stored data just prior to the failure. As described further below, in various examples there may be one or more predefined or configurable triggers (CP triggers). Responsive to a given CP trigger (or at a CP), the file system may save any data that was modified by write requests to persistent data storage media.

As used herein, a "RAID stripe" generally refers to a set of blocks spread across multiple storage devices (e.g., disks of a disk array, disks of a disk shelf, or cloud volumes) to form a parity group (or RAID group).

As used herein, an "allocation area" or "AA" generally refers to a group of RAID stripes. In various examples described herein a single storage pod may be shared by a distributed storage system by assigning ownership of AAs to respective dynamically extensible file systems of a storage system.

As used herein, a "free allocation area" or "free AA" generally refers to an AA in which no PVBNs of the AA are marked as used, for example, by any active maps of a given dynamically extensible file system.

As used herein, a "partial allocation area" or "partial AA" generally refers to an AA in which one or more PVBNs of the AA are marked as in use (containing valid data), for example, by an active map of a given dynamically extensible file system. As discussed further below, in connection with space balancing, while it is preferable to perform AA ownership changes of free AAs, in various examples, space balancing may involve one dynamically extensible file system donating one or more partial AAs to another dynamically extensible file system. In such cases, the additional cost of copying portions of one or more associated data structures (e.g., bit maps, such as an active map, a refcount map, a summary map, an AA information map, and a space map) relating to storage space information may be incurred. No such additional cost is incurred when moving or changing ownership of free AAs. These associated data structures may, among other things, track which PVBNs are in use, track PVBN counts per AA (e.g., total used blocks and shared references to blocks) and other flags.

As used herein, a "storage pod" generally refers to a group of disks containing multiple RAID groups that are accessible from all storage systems (nodes) of a distributed storage system (cluster).

As used herein, a "data pod" generally refers to a set of storage systems (nodes) that share the same storage pod. In some examples, a data pod refers to a single cluster of nodes representing a distributed storage system. In other examples, there can be multiple data pods in a cluster. Data pods may be used to limit the fault domain and there can be multiple HA pairs of nodes within a data pod.

As used herein, an "active map" is a data structure that contains information indicative of which PVBNs of a distributed file system are in use. In one embodiment, the active map is represented in the form of a sparce bit map in which each PVBN of a global PVBN space of a storage pod has a corresponding Boolean value (or truth value) represented as a single bit, for example, in which the true (1) indicates the corresponding PVBN is in use and false (0) indicates the corresponding PVBN is not in use.

As used herein, a "dynamically extensible file system" or a "DEFS" generally refers to a file system of a data pod or a cluster that has visibility into the entire global PVBN space of a storage pod and hosts multiple volumes. A DEFS may be thought of as a data container or a storage container (which may be referred to as a storage segment container) to which AAs are assigned, thereby resulting in a more flexible and enhanced version of a node-level aggregate. As described further herein (for example, in connection with automatic space balancing), the storage space associated with one or more AAs of a given DEFS may be dynamically transferred or moved on demand to any other DEFS in the cluster by changing the ownership of the one or more AAs and moving associated AA tracking data structures as appropriate. This provides the unique ability to independently scale each DEFS of a cluster. For example, DEFSs can shrink or grow dynamically over time to meet their respective storage needs and silos of storage space are avoided. In one embodiment, a distributed file system comprises multiple instances of the WAFL Copy-on-Write file system running on respective storage systems (nodes) of a distributed storage system (cluster) that represents the data pod. In various examples described herein, a given storage system (node) of a distributed storage system (cluster) may own one or more DEFSs including, for example, a log DEFS for hosting an operation log or journal of certain storage operations that have been performed by the node since the last CP and a data DEFS for hosting customer volumes or logical unit numbers (LUNs). As described further below, the partitioning/division of a storage pod into AAs (creation of a disaggregated storage space) and the distribution of ownership of AAs among DEFSs of multiple nodes of a cluster may facilitate implementation of a distributed storage system having a disaggregated storage architecture. In various examples described herein, each storage system may have its own portion of disaggregated storage to which it has the exclusive ability to perform write access, thereby simplifying storage management by, among otherings, not requiring implementation of access control mechanisms, for example, in the form of locks. At the same time, each storage system also has visibility into the entirety of a global PVBN space, thereby allowing read access by a given storage system to any portion of the disaggregated storage regardless of which node of the cluster is the current owner of the underlying allocation areas. Based disclosure provided herein, those skilled in the art will understand there are at least two types of disaggregation represented/achieved within various examples, including (i) the disaggregation of storage space provided by a storage pod by dividing or partitioning the storage space into AAs the ownership of which can be fluidly changed from one DEFS to another on demand and (ii) the disaggregation of the storage architecture into independent components, including the decoupling of processing resources and storage resources, thereby allowing them to be independently scaled. In one embodiment, the former (which may also be referred to as modular storage, partitioned storage, adaptable storage, or fluid storage) facilitates the latter.

As used herein, an "allocation area map" or "AA map" generally refers to a per dynamically extensible file system data structure or file (e.g., a metafile) that contains information at an AA-level of granularity indicative of which AAs are assigned to or "owned" by a given dynamically extensible file system.

A "node-level aggregate" generally refers to a file system of a single storage system (node) that holds multiple volumes created over one or more RAID groups, in which the node owns the entire PVBN space of the collection of disks of the one or more RAID groups. Node-level aggregates are only accessible from a single storage system (node) of a distributed storage system (cluster) at a time.

As used herein, an "inode" generally refers to a file data structure maintained by a file system that stores metadata for data containers (e.g., directories, subdirectories, disk files, etc.). An inode may include, among other things, location, file size, permissions needed to access a given file with which it is associated as well as creation, read, and write timestamps, and one or more flags.

As used herein, a "storage volume" or "volume" generally refers to a container in which applications, databases, and file systems store data. A volume is a logical component created for the host to access storage on a storage array. A volume may be created from the capacity available in storage pod, a pool, or a volume group. A volume has a defined capacity. Although a volume might consist of more than one drive, a volume appears as one logical component to the host. Non-limiting examples of a volume include a flexible volume and a flexgroup volume.

As used herein, a "flexible volume" generally refers to a type of storage volume that may be efficiently distributed across multiple storage devices. A flexible volume may be capable of being resized to meet changing business or application requirements. In some embodiments, a storage system may provide one or more aggregates and one or more storage volumes distributed across a plurality of nodes interconnected as a cluster. Each of the storage volumes may be configured to store data such as files and logical units. As such, in some embodiments, a flexible volume may be comprised within a storage aggregate and further comprises at least one storage device. The storage aggregate may be abstracted over a RAID plex where each plex comprises a RAID group. Moreover, each RAID group may comprise a plurality of storage disks. As such, a flexible volume may comprise data storage spread over multiple storage disks or devices. A flexible volume may be loosely coupled to its containing aggregate. A flexible volume can share its containing aggregate with other flexible volumes. Thus, a single aggregate can be the shared source of all the storage used by all the flexible volumes contained by that aggregate. A non-limiting example of a flexible volume is a NetApp ONTAP FlexVol volume.

As used herein, a "flexgroup volume" generally refers to a single namespace that is made up of multiple constituent/member volumes. A non-limiting example of a flexgroup volume is a NetApp ONTAP FlexGroup volume that can be managed by storage administrators, and which acts like a NetApp FlexVol volume. In the context of a flexgroup volume, "constituent volume" and "member volume" are interchangeable terms that refer to the underlying volumes (e.g., flexible volumes) that make up the flexgroup volume.

Example Distributed Storage System Cluster

FIG. 1 is a block diagram illustrating a plurality of nodes 110*a*-*b* interconnected as a cluster 100 in accordance with an embodiment of the present disclosure. In the context of the present example, the nodes 110*a*-*b* comprise various functional components that cooperate to provide a distributed storage system architecture of the cluster 100. To that end, in the context of the present example, each node is generally organized as a network element (e.g., network element 120*a* or 120*b*) and a disk element (e.g., disk element 150*a* or 150*b*). The network element includes functionality that enables the node to connect to clients (e.g., client 180) over a computer network 140, while each disk element 350 connects to one or more storage devices, such as disks, of one or more disk arrays (not shown) or of one or more storage shelves (not shown), represented as a single shared storage pod 145.

In the context of the present example, the nodes 110*a*-*b* are interconnected by a cluster switching fabric 151 which, in an example, may be embodied as a Gigabit Ethernet switch. It should be noted that while there is shown an equal number of network and disk elements in the illustrative cluster 100, there may be differing numbers of network and/or disk elements. For example, there may be a plurality of network elements and/or disk elements interconnected in a cluster configuration 100 that does not reflect a one-to-one correspondence between the network and disk elements. As such, the description of a node comprising one network element and one disk element should be taken as illustrative only.

Clients may be general-purpose computers configured to interact with the node in accordance with a client/server model of information delivery. That is, each client (e.g., client 180) may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (ISCSI) and SCSI encapsulated over Fibre Channel (FCP), when accessing information in the form of blocks. In various examples described herein, an administrative user (not shown) of the client may make use of a user interface (UI) presented by the cluster or a command line interface (CLI) of the cluster to, among other things, establish a data protection relationship between a source volume and a destination volume (e.g., a mirroring relationship specifying one or more policies associated with creation, retention, and transfer of snapshots), defining snapshot and/or backup policies, and association of snapshot policies with snapshots.

Disk elements 150*a* and 150*b* are illustratively connected to disks (not shown) within that may be organized into disk arrays within the storage pod 145. Alternatively, storage devices other than disks may be utilized, e.g., flash memory, optical storage, solid state devices, etc. As such, the description of disks should be taken as exemplary only.

In general, various embodiments envision a cluster (e.g., cluster 100) in which every node (e.g., nodes 110*a*-*b*) can essentially talk to every storage device (e.g., disk) in the storage pod 145. This is in contrast to the distributed storage system architecture described with reference to FIG. 5. In examples described herein, all nodes (e.g., nodes 110*a*-*b*) of the cluster have visibility and read access to an entirety of a global PVBN space of the storage pod 145, for example, via an interconnect layer 142. As described further below, according to one embodiment, the storage within the storage pod 145 is grouped into distinct allocation areas (AAs) than can be assigned to a given dynamically extensible file system (DEFS) of a node to facilitate implementation disaggregated storage. In examples described herein, the AAs assigned to a given DEFS may be said to "own" the assigned AAs and the node owning the given DEFS has the exclusive write access to the associated PVBNs and the exclusive ability to perform write allocation from such blocks. In one embodiment, each node has its own view of a portion of the disaggregated storage represented by the assignment of, for example, via respective allocation area (AA) maps and active maps. This granular assignment of AAs and ability to fluidly change ownership of AAs as needed facilitates the elimination of per-node storage silos and provides higher and more predictable performance, which further translate into improved storage utilization and improvements in cost effectiveness of the storage solution.

Depending on the particular implementation, the interconnect layer 142 may be represented by an intermediate switching topology or some other interconnectivity layer or disk switching layer between the disks in the storage pod 145 and the nodes. Non-limiting examples of the interconnect layer 150 include one or more fiber channel switches or one or more non-volatile memory express (NVMe) fabric switches. Additional details regarding the storage pod 145, DEFSs, AA maps, active maps, and the use, ownership, and sharing (transferring of ownership) of AAs are described further below.

Example Storage System Node

Figure 2:
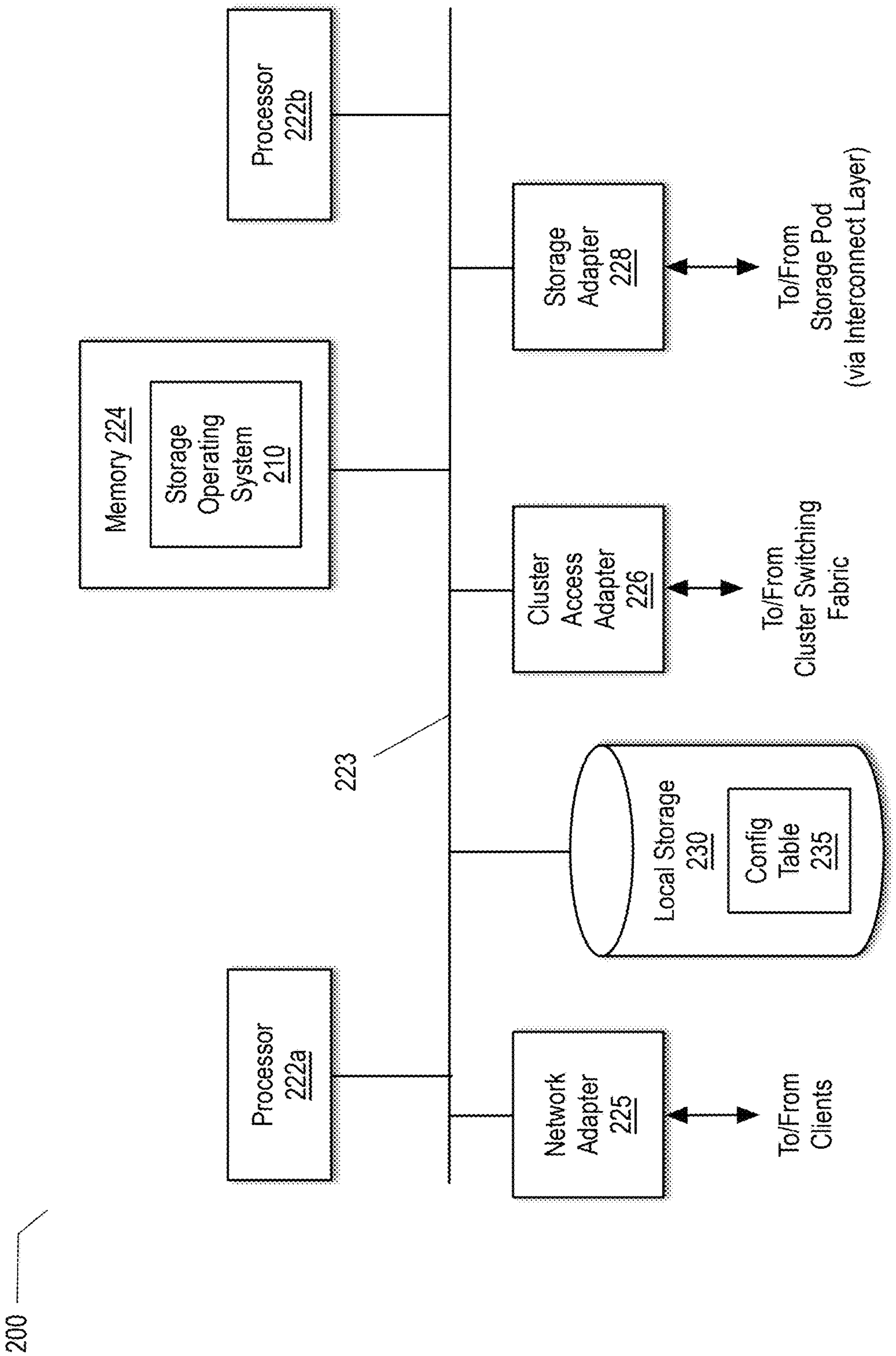
FIG. 2 is a block diagram illustrating a node in accordance with an embodiment of the present disclosure.

FIG. 2 is a block diagram of a node 200 that is illustratively embodied as a storage system comprising a plurality of processors (e.g., processors 222*a-b*), a memory 224, a network adapter 225, a cluster access adapter 226, a storage adapter 228 and local storage 230 interconnected by a system bus 223. Node 200 may be analogous to nodes 110*a* and 110*b* of FIG. 1. The local storage 230 comprises one or more storage devices, such as disks, utilized by the node to locally store configuration information (e.g., in configuration table 235). The cluster access adapter 226 comprises a plurality of ports adapted to couple the node 200 to other nodes of the cluster (e.g., cluster 100). Illustratively, Ethernet is used as the clustering protocol and interconnect media, although it will be apparent to those skilled in the art that other types of protocols and interconnects may be utilized within the cluster architecture described herein. Alternatively, where the network elements and disk elements are implemented on separate storage systems or computers, the cluster access adapter 226 is utilized by the network and disk element for communicating with other network and disk elements in the cluster.

In the context of the present example, each node 200 is illustratively embodied as a dual processor storage system executing a storage operating system 210 that implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor (e.g., processor 222*a*) may execute the functions of the network element (e.g., network element 120*a* or 120*b*) on the node, while the other processor (e.g., processor 222*b*) may execute the functions of the disk element (e.g., disk element 150*a* or 150*b*).

The memory 224 illustratively comprises storage locations that are addressable by the processors and adapters for storing software program code and data structures associated with the subject matter of the disclosure. The processor and adapters may, in turn, comprise processing elements and/or logic circuitry configured to execute the software code and manipulate the data structures. The storage operating system 210, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the disclosure described herein.

The network adapter 225 comprises a plurality of ports adapted to couple the node 200 to one or more clients (e.g., client 180) over point-to-point links, wide area networks, virtual private networks implemented over a public network (Internet) or a shared local area network. The network adapter 225 thus may comprise the mechanical, electrical and signaling circuitry needed to connect the node to a network (e.g., computer network 140). Illustratively, the network may be embodied as an Ethernet network or a Fibre Channel (FC) network. Each client (e.g., client 180) may communicate with the node over network by exchanging discrete frames or packets of data according to pre-defined protocols, such as TCP/IP.

The storage adapter 228 cooperates with the storage operating system 210 executing on the node 200 to access information requested by the clients. The information may be stored on any type of attached array of writable storage device media such as video tape, optical, DVD, magnetic tape, bubble memory, electronic random access memory, micro-electromechanical and any other similar media adapted to store information, including data and parity information. However, as illustratively described herein, the information is stored on disks (e.g., associated with storage pod 145). The storage adapter comprises a plurality of ports having input/output (I/O) interface circuitry that couples to the disks over an I/O interconnect arrangement, such as a conventional high-performance, FC link topology.

Storage of information on each disk array may be implemented as one or more storage "volumes" that comprise a collection of physical storage disks or cloud volumes cooperating to define an overall logical arrangement of volume block number (VBN) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

While in the context of the present example, the node may be a physical host, it is to be appreciated the node may be implemented in virtual form. For example, a storage system may be run (e.g., on a VM or as a containerized instance, as the case may be) within a public cloud provider. As such, a cluster representing a distributed storage system may be comprised of multiple physical nodes (e.g., node 200) or multiple virtual nodes (virtual storage systems).

Example Storage Operating System

To facilitate access to the disks (e.g., disks within one or more disk arrays of a storage pod, such as storage pod 145 of FIG. 1), a storage operating system (e.g., storage operating system 300, which may be analogous to storage operating system 210) may implement a write-anywhere file system that cooperates with one or more virtualization modules to "virtualize" the storage space provided by disks.

The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (LUNs).

Illustratively, the storage operating system may be the Data ONTAP operating system available from NetApp, Inc., San Jose, Calif. that implements the WAFL file system. However, it is expressly contemplated that any appropriate storage operating system may be enhanced for use in accordance with the inventive principles described herein. As such, where the term "WAFL" is employed, it should be taken broadly to refer to any file system that is otherwise adaptable to the teachings of this disclosure.

Figure 3:
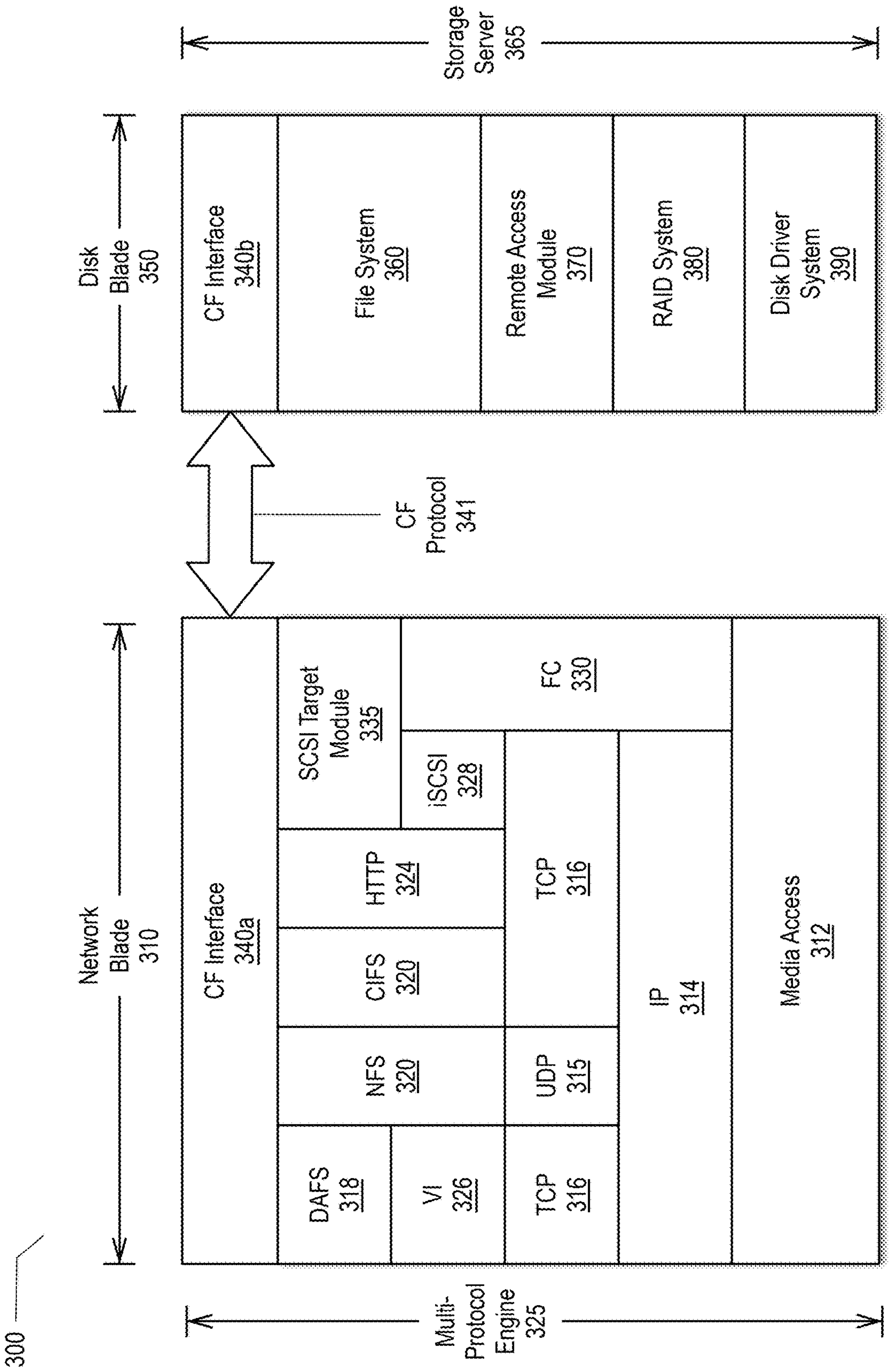
FIG. 3 is a block diagram illustrating a storage operating system in accordance with an embodiment of the present disclosure.

FIG. 3 is a block diagram illustrating a storage operating system 300 in accordance with an embodiment of the present disclosure. In the context of the present example, the storage operating system 300 is shown including a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of LUNs to either iSCSI or FCP or, alternatively, to both iSCSI and FCP when accessing the blocks on the node (e.g., node 200).

In addition, the storage operating system may include a series of software layers organized to form a storage server 365 that provides data paths for accessing information stored on the disks (e.g., disks 130) of the node. To that end, the storage server 365 includes a file system module 360 in cooperating relation with a remote access module 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 may implement a virtualization system of the storage operating system 300 through the interaction with one or more virtualization modules illustratively embodied as, for example, a virtual disk (vdisk) module (not shown) and a SCSI target module 335. The SCSI target module 335 is generally disposed between the FC and iSCSI drivers 328, 330 and the file system 360 to provide a translation layer of the virtualization system between the block (LUN) space and the file system space, where LUNs are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements an exemplary a file system having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from a client (e.g., client 180) is forwarded as a packet over a computer network (e.g., computer network 140) and onto a node (e.g., node 200) where it is received at a network adapter (e.g., network adaptor 225). A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical VBN. The file system then passes a message structure including the logical VBN to the RAID system 380; the logical VBN is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

The remote access module 370 is operatively interfaced between the file system module 360 and the RAID system module 380. Remote access module 370 is illustratively configured as part of the file system to implement the functionality to determine whether a newly created data container, such as a subdirectory, should be stored locally or remotely. Alternatively, the remote access module 370 may be separate from the file system. As such, the description of the remote access module being part of the file system should be taken as exemplary only. Further, the remote access module 370 determines which remote flexible volume should store a new subdirectory if a determination is made that the subdirectory is to be stored remotely. More generally, the remote access module 370 implements the heuristics algorithms used for the adaptive data placement. However, it should be noted that the use of a remote access module should be taken as illustrative. In alternative aspects, the functionality may be integrated into the file system or other module of the storage operating system. As such, the description of the remote access module 370 performing certain functions should be taken as exemplary only.

It should be noted that the software "path" through the storage operating system layers described above needed to perform data storage access for the client request received at the node may alternatively be implemented in hardware. That is, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Alternatively, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node (e.g., node 200), implement data access semantics of a general purpose operating system. The storage operating system can also be implemented as a microkernel, an application program operating over a general-purpose operating system, such as UNIX or Windows NT, or as a general-purpose operating system with configurable functionality, which is configured for storage applications as described herein.

In addition, it will be understood to those skilled in the art that aspects of the disclosure described herein may apply to any type of special-purpose (e.g., file server, filer or storage serving appliance) or general-purpose computer, including a standalone computer or portion thereof, embodied as or including a storage system. Moreover, the teachings contained herein can be adapted to a variety of storage system architectures including, but not limited to, a network-attached storage environment, a storage area network and disk assembly directly attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the subject matter may be utilized with any suitable file system, including a write in place file system.

Example Cluster Fabric (CF) Protocol

Illustratively, the storage server 365 is embodied as disk element (or disk blade 350, which may be analogous to disk element 150*a* or 150*b*) of the storage operating system 300 to service one or more volumes of array 160. In addition, the multi-protocol engine 325 is embodied as network element (or network blade 310, which may be analogous to network element 120*a* or 120*b*) to (i) perform protocol termination with respect to a client issuing incoming data access request packets over the network (e.g., network 140), as well as (ii) redirect those data access requests to any storage server 365 of the cluster (e.g., cluster 100). Moreover, the network element 310 and disk element 350 cooperate to provide a highly scalable, distributed storage system architecture of the cluster. To that end, each module may include a cluster fabric (CF) interface module (e.g., CF interface 340*a* and 340*b*) adapted to implement intra-cluster communication among the nodes (e.g., node 110*a* and 110*b*). In the context of a distributed storage architecture as described below with reference to FIG. 5 in which node-level aggregates are employed, the CF protocol facilitates, among other things, internode communications relating to data access requests. It is to be appreciated such internode communications relating to data access requests are not needed in the context of a distributed storage architecture as described below with reference to FIG. 6 in which each node of a cluster has visibility and access to the entirety of a global PVBN space of a storage pod (via their respective DEFSs). However, in various embodiments, some limited amount of internode communications, for example, relating to storage space reporting (or simply space reporting) and storage space requests (e.g., requests for donations of AAs) continue to be useful. As described further below, such internode communications may make use of the CF protocol or other forms of internode communications, including message passing via on-wire communications and/or the use of one or more persistent message queues (or on-disk message queues), which may make use of the fact that all nodes can read from all disk of a storage pod. For example, a persistent message queue may be maintained at the node and/or DEFS-level of granularity in which each node and/or DEFS has a message queue to which others can post messages destined for the node or DEFS (as the case may be). In one embodiment, each DEFS has an associated inbound queue on which it receives messages sent by another DEFS in the cluster and an associated outbound queue on which it posts messages intended for delivery to another DEFS in the cluster The protocol layers, e.g., the NFS/CIFS layers and the iSCSI/IFC layers, of the network element 310 may function as protocol servers that translate file-based and block based data access requests from clients into CF protocol messages used for communication with the disk element 350. That is, the network element servers may convert the incoming data access requests into file system primitive operations (commands) that are embedded within CF messages by the CF interface module 340 for transmission to the disk elements of the cluster.

Further, in an illustrative aspect of the disclosure, the network element and disk element are implemented as separately scheduled processes of storage operating system 300; however, in an alternate aspect, the modules may be implemented as pieces of code within a single operating system process. Communication between a network element and disk element may thus illustratively be effected through the use of message passing between the modules although, in the case of remote communication between a network element and disk element of different nodes, such message passing occurs over a cluster switching fabric (e.g., cluster switching fabric 151). A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp, Inc.

The CF interface module 340 implements the CF protocol for communicating file system commands among the nodes or modules of cluster. Communication may be illustratively effected by the disk element exposing the CF API to which a network element (or another disk element) issues calls. To that end, the CF interface module 340 may be organized as a CF encoder and CF decoder. The CF encoder of, e.g., CF interface 340*a* on network element 310 encapsulates a CF message as (i) a local procedure call (LPC) when communicating a file system command to a disk element 350 residing on the same node 200 or (ii) a remote procedure call (RPC) when communicating the command to a disk element residing on a remote node of the cluster 100. In either case, the CF decoder of CF interface 340*b* on disk element 350 de-encapsulates the CF message and processes the file system command.

Illustratively, the remote access module 370 may utilize CF messages to communicate with remote nodes to collect information relating to remote flexible volumes. A CF message is used for RPC communication over the switching fabric between remote modules of the cluster; however, it should be understood that the term "CF message" may be used generally to refer to LPC and RPC communication between modules of the cluster. The CF message includes a media access layer, an IP layer, a UDP layer, a reliable connection (RC) layer and a CF protocol layer. The CF protocol is a generic file system protocol that may convey file system commands related to operations contained within client requests to access data containers stored on the cluster; the CF protocol layer is that portion of a message that carries the file system commands. Illustratively, the CF protocol is datagram based and, as such, involves transmission of messages or "envelopes" in a reliable manner from a source (e.g., a network element 310) to a destination (e.g., a disk element 350). The RC layer implements a reliable transport protocol that is adapted to process such envelopes in accordance with a connectionless protocol, such as UDP.

Example File System Layout

In one embodiment, a data container is represented in the write-anywhere file system as an inode data structure adapted for storage on the disks of a storage pod (e.g., storage pod 145). In such an embodiment, an inode includes a meta-data section and a data section. The information stored in the meta-data section of each inode describes the data container (e.g., a file, a snapshot, etc.) and, as such, includes the type (e.g., regular, directory, vdisk) of file, its size, time stamps (e.g., access and/or modification time) and ownership (e.g., user identifier (UID) and group ID (GID), of the file, and a generation number. The contents of the data section of each inode may be interpreted differently depending upon the type of file (inode) defined within the type field. For example, the data section of a directory inode includes meta-data controlled by the file system, whereas the data section of a regular inode includes file system data. In this latter case, the data section includes a representation of the data associated with the file.

Specifically, the data section of a regular on-disk inode may include file system data or pointers, the latter referencing 4 KB data blocks on disk used to store the file system data. Each pointer is preferably a logical VBN to facilitate efficiency among the file system and the RAID system when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section of the inode (e.g., a second level inode) references an indirect block (e.g., a first level L1 block) that contains 224 pointers, each of which references a 4 KB data block on disk. For file system data having a size greater than 64 MB, each pointer in the data section of the inode (e.g., a third level L3 inode) references a double-indirect block (e.g., a second level L2 block) that contains 224 pointers, each referencing an indirect (e.g., a first level L1) block. The indirect block, in turn, which contains 224 pointers, each of which references a 4 kB data block on disk. When accessing a file, each block of the file may be loaded from disk into memory (e.g., memory 224). In other embodiments, higher levels are also possible that may be used to handle larger data container sizes.

When an on-disk inode (or block) is loaded from disk into memory, its corresponding in-core structure embeds the on-disk structure. The in-core structure is a block of memory that stores the on-disk structure plus additional information needed to manage data in the memory (but not on disk). The additional information may include, e.g., a "dirty" bit. After data in the inode (or block) is updated/modified as instructed by, e.g., a write operation, the modified data is marked "dirty" using the dirty bit so that the inode (block) can be subsequently "flushed" (stored) to disk.

According to one embodiment, a file in a file system comprises a buffer tree that provides an internal representation of blocks for a file loaded into memory and maintained by the write-anywhere file system 360. A root (top-level) buffer, such as the data section embedded in an inode, references indirect (e.g., level 1) blocks. In other embodiments, there may be additional levels of indirect blocks (e.g., level 2, level 3) depending upon the size of the file. The indirect blocks (e.g., and inode) includes pointers that ultimately reference data blocks used to store the actual data of the file. That is, the data of file are contained in data blocks and the locations of these blocks are stored in the indirect blocks of the file. Each level 1 indirect block may include pointers to as many as 224 data blocks. According to the "write anywhere" nature of the file system, these blocks may be located anywhere on the disks.

In one embodiment, a file system layout is provided that apportions an underlying physical volume into one or more virtual volumes (or flexible volumes) of a storage system, such as node 200. In such an embodiment, the underlying physical volume is an aggregate comprising one or more groups of disks, such as RAID groups, of the node. The aggregate has its own physical volume block number (PVBN) space and maintains meta-data, such as block allocation structures, within that PVBN space. Each flexible volume has its own virtual volume block number (VVBN) space and maintains meta-data, such as block allocation structures, within that VVBN space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In a further embodiment, PVBNs are used as block pointers within buffer trees of files stored in a flexible volume. This "hybrid" flexible volume example involves the insertion of only the PVBN in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following PVBNs (instead of VVBNs) to find appropriate locations of blocks; in this context, the read path (and corresponding read performance) of a flexible volume is substantially similar to that of a physical volume. Translation from PVBN-to-disk,dbn occurs at the file system/RAID system boundary of the storage operating system 300.

In a dual VBN hybrid flexible volume example, both a PVBN and its corresponding VVBN are inserted in the parent indirect blocks in the buffer tree of a file. That is, the PVBN and VVBN are stored as a pair for each block pointer in most buffer tree structures that have pointers to other blocks, e.g., level 1 (L1) indirect blocks, inode file level 0 (L0) blocks.

A root (top-level) buffer, such as the data section embedded in an inode, references indirect (e.g., level 1) blocks. Note that there may be additional levels of indirect blocks (e.g., level 2, level 3) depending upon the size of the file. The indirect blocks (and inode) include PVBN/VVBN pointer pair structures that ultimately reference data blocks used to store the actual data of the file. The PVBNs reference locations on disks of the aggregate, whereas the VVBNs reference locations within files of the flexible volume. The use of PVBNs as block pointers in the indirect blocks provides efficiencies in the read paths, while the use of VVBN block pointers provides efficient access to required meta-data. That is, when freeing a block of a file, the parent indirect block in the file contains readily available VVBN block pointers, which avoids the latency associated with accessing an owner map to perform PVBN-to-VVBN translations; yet, on the read path, the PVBN is available.

Example Hierarchical Inode Tree

Figure 4:
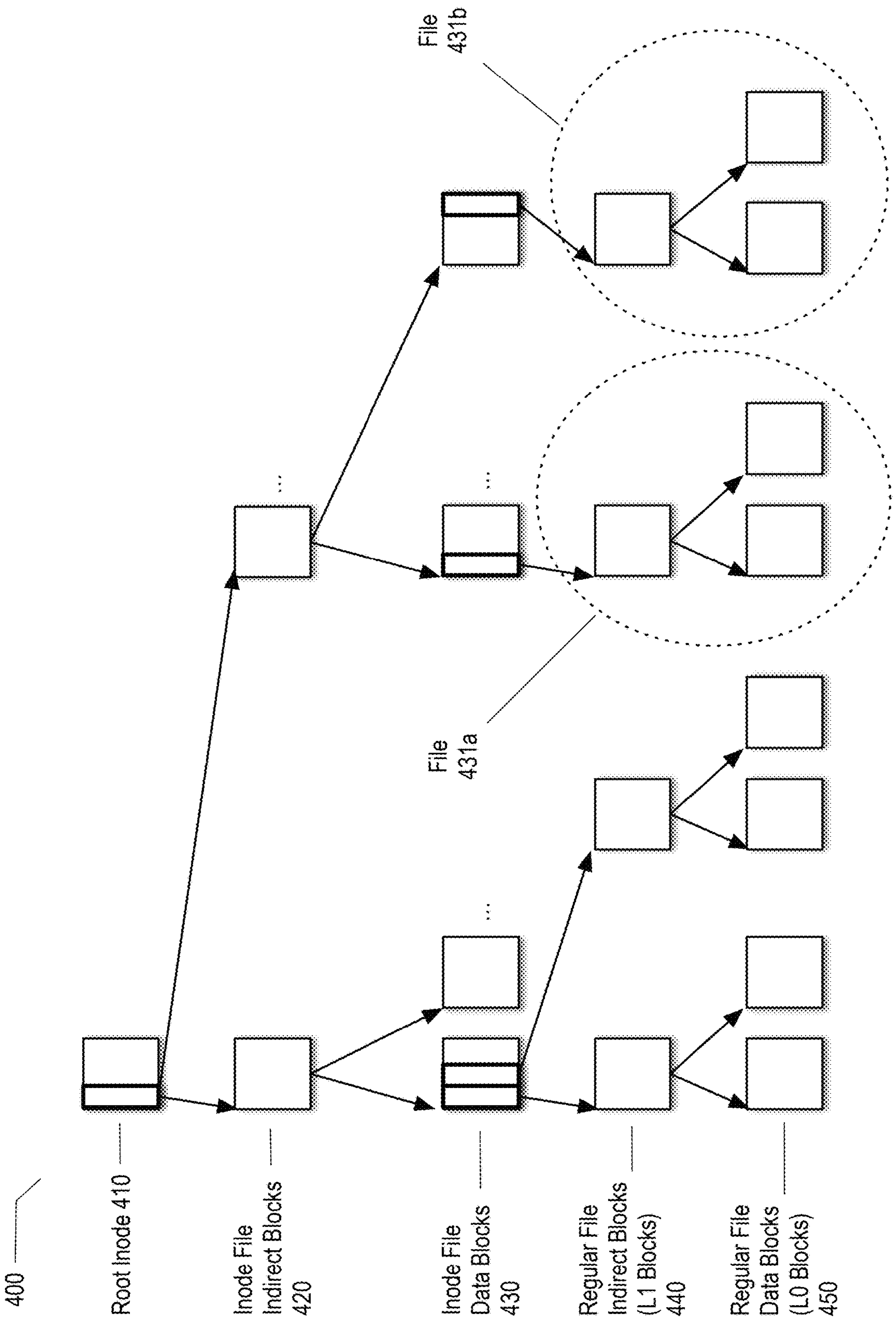
FIG. 4 is a block diagram illustrating a tree of blocks representing of an example a file system layout in accordance with an embodiment of the present disclosure.

FIG. 4 is a block diagram illustrating a tree of blocks 400 representing a simplified view of an example a file system layout in accordance with an embodiment of the present disclosure. In one embodiment, the data storage system nodes (e.g., data storage systems 110*a-b*) make use of a write anywhere file system (e.g., the WAFL file system). The write anywhere file system may represent a UNIX compatible file system that is optimized for network file access. In the context of the present example, the write anywhere file system is a block-based file system that represents file system data (e.g., a block map file and an inode map file), meta-data files, and data containers (e.g., volumes, subdirectories, and regular files) in a tree of blocks (e.g., tree of blocks 400). Keeping meta-data in files allows the file system to write meta-data blocks anywhere on disk and makes it easier to increase the size of the file system on the fly.

In this simplified example, the tree of blocks 400 has a root inode 410, which describes an inode map file (not shown), made up of inode file indirect blocks 420 and inode file data blocks 430. In this example, the file system uses inodes (e.g., inode file data blocks 430) to describe data containers representing files (e.g., file 431*a* and file 431*b*). In one embodiment, each inode contains 16 block pointers to indicate which blocks (e.g., of 4 KB) belong to a given data container (e.g., a file). Inodes for data containers smaller than 64 KB may use the 156 block pointers to point to file data blocks or simply data blocks (e.g., regular file data blocks, which may also be referred to herein as L0 blocks 450). Inodes for files smaller than 64 MB may point to indirect blocks (e.g., regular file indirect blocks, which may also be referred to herein as L1 blocks 440), which point to actual file data. Inodes for larger files or data containers may point to doubly indirect blocks. For very small files, data may be stored in the inode itself in place of the block pointers.

As will be appreciated by those skilled in the art given the above-described file system layout, yet another advantage of DEFSs are their ability to facilitate storage space balancing and/or load balancing. This comes from the fact that the entire global PVBN space of a storage pod is visible to all DEFSs of the cluster and therefore any given DEFS can get access to an entire file by copying the top-most PVBN from the inode on another tree.

Example of a Distributed Storage System Architecture with Storage Silos

Figure 5:
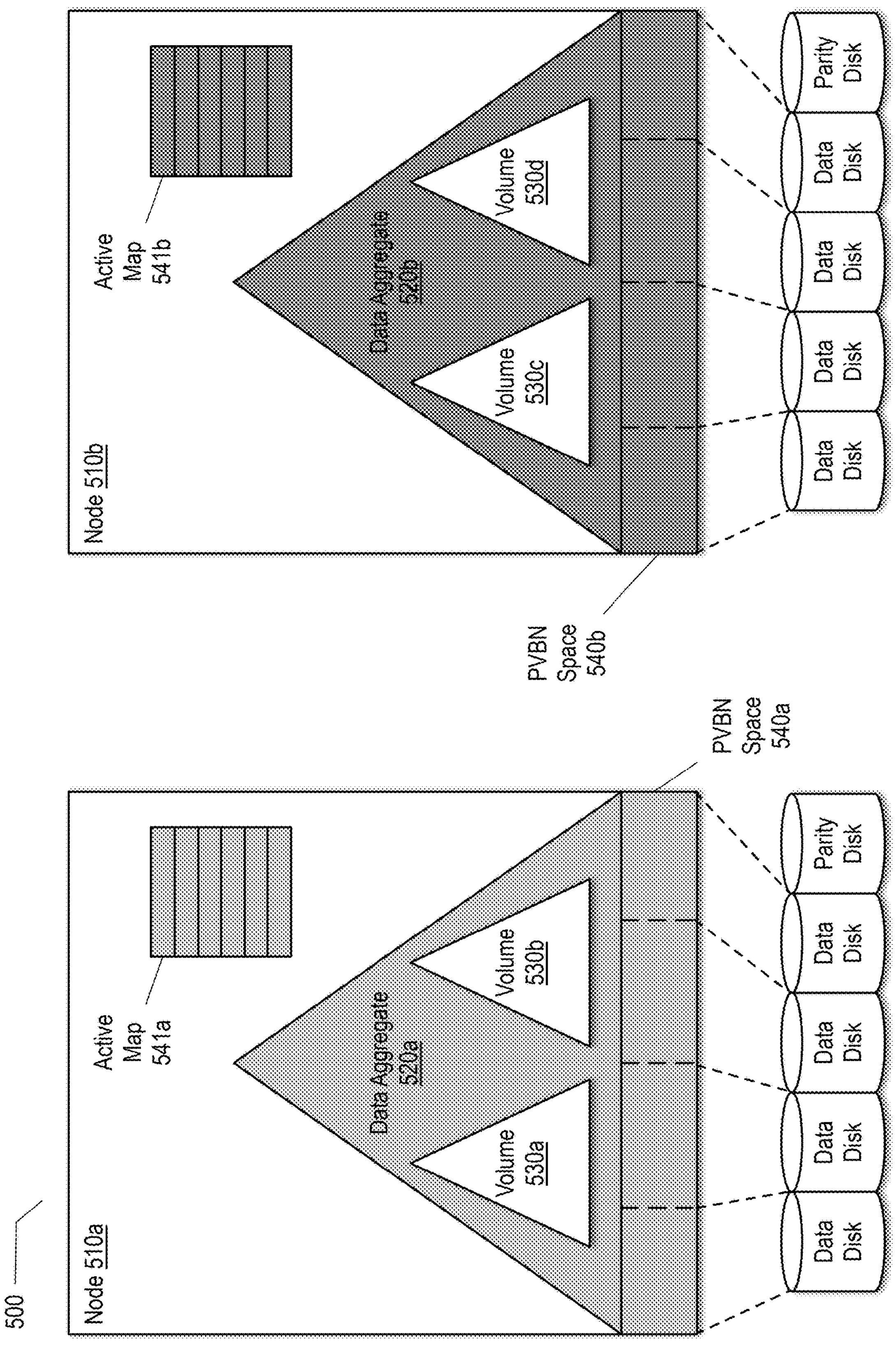
FIG. 5 (Prior Art)
FIG. 5 is a block diagram illustrating a distributed storage system architecture in which the entirety of a given disk and a given RAID group are owned by an aggregate and the aggregate file system is only visible from one node, thereby resulting in silos of storage space.

FIG. 5 is a block diagram illustrating a distributed storage system architecture 500 in which the entirety of a given disk and a given RAID group are owned by an aggregate and the aggregate file system is only visible from one node, thereby resulting in silos of storage space. In the context of FIG. 5, node 510*a* and node 510*b* may represent a two-node cluster in which the nodes are high-availability (HA) partners. For example, one node may represent a primary node and the other may represent a secondary node in which pairwise disk connectively supports a pairwise failover model. As shown, each node includes respective active maps (e.g., active map 541*a* and active map 541*b*) and a sets of disks (in this case, ten disks) they can talk to. The nodes may partition the disks among themselves as aggregates (e.g., data aggregate 520*a* and data aggregate 520*b*) and at steady state both nodes will work on their own subset of disks representing a one or more RAID groups (in this case, four data disks and one parity disk, forming a single RAID group). A RAID layer or subsystem (not shown) of a storage operating system (not shown) of each node may present respective separate and independent PVBN spaces (e.g., PVBN space 540*a* and PVBN space 540*b*) to a file system layer (not shown) of the node.

In this example, therefore, data aggregate 520*a* has visibility only to a first PVBN space (e.g., PVBN space 540*a*) and data aggregate 520*b* has visibility only to a second PVBN space (e.g., PVBN space 540*b*). When data is stored to volume 530*a* or 530*b*, it is striped across the subset of disks that are part of data aggregate 520*a*; and when data is stored to volume 530*c* or 530*d*, it is are striped across the subset of disks that are part of data aggregate 520*b*. Active map 541*a* is a data structure (e.g., a bit map with one bit per PVBN) that that identifies the PVBNs within PVBN space 540*a* that are in use by data aggregate 520*a*. Similarly, active map 541*b* is a data structure (e.g., a bit map with one bit per PVBN) that that identifies the PVBNs within PVBN space 540*b* that are in use by data aggregate 520*b*.

As can be seen, for any given disk, the entire disk is owned by a particular aggregate and the aggregate file system is only visible from one node. Similarly, for any given RAID group, the available storage space of the entire RAID group is useable only by a single node. There are various other disadvantages to the architecture shown in FIG. 5. For example, moving a volume from one aggregate to another requires copying of data (e.g., reading all the blocks used by the volume and writing them to the new location), with an elaborate handover sequence between the aggregates involved. Additionally, there are scenarios in which one data aggregate may run out of storage space while the other still has plentiful free storage space, resulting in ineffective usage of the storage space provided by the disks. While the size of the PVBN space of an aggregate may be increased, doing so typically requires an administrative user to monitor the storage space on each node-level aggregate and add one or more disks and/or RAID groups to the aggregate. As described further below with reference to FIG. 6, with DEFSs storage space is added to a common pool of storage referred to herein as a "storage pod" and space is available for consumption by any DEFS in the cluster, thereby making space management much simpler and facilitating the automatic balancing of storage space without administrator involvement.

Example Distributed System Architecture Providing Disaggregated Storage

Before getting into the details of a particular example, various properties, constructs, and principles relating to the use and implementation of DEFSs will now be discussed. As noted above, it is desirable to make the global PVBN space of the entire storage pool available on each DEFS of a data pod, which may include one or more clusters. This feature facilitates the performance of, among other things, instant copy-free moves of volumes from one DEFS to another, for example, in connection with performing load balancing. Creating clones on remote nodes for load balancing is yet another benefit. With a global PVBN space, support for global data deduplication can also be supported rather than deduplication being limited to node-level aggregates.

It is also beneficial, in terms of performance, to avoid the use of access control mechanism, such as locks, to coordinate write accesses and write allocation among nodes generally and DEFSs specifically. Such access control mechanisms may be eliminated by specifying, at a per-DEFS level, those portions of the disaggregated storage of the storage pod to which a given DEFS has exclusive write access. For example, as described further below, a DEFS may be limited to use of only the AAs associated with (assigned to or owned by) the DEFS for performing write allocation and write accesses during a CP. Advantageously, given the visibility into the entire global PVBN space, reads can be performed by any DEFS of the cluster from all the PVBNs in the storage pod.

Each DEFS of a given cluster (or data pod, as the case may be) may start at its own super block. As shown and described with reference to FIG. 6, a predefined AA (e.g., the first AA) in storage pod may be dedicated for super blocks. In one embodiment, a set of RAID stripes within the predefined super block AA (e.g., the first AA of the storage pod) may be dedicated for super blocks. In this predefined super block AA, ownership may be specified at the granularity of a single RAID stripe instead of at the AA granularity of multiple RAID stripes representing one or more GB (e.g., between approximately 1 GB and 10 GB) of storage space. The location of a super block of a given DEFS can be mathematically derived using an identifier (a DEFS ID) associated with the given DEFS. Since the RAID stripe is already reserved for a super block, it can be replicated on N disks.

Each DEFS has AAs associated with it, which may be thought of conceptually as the DEFS owning those AAs. In one embodiment, AAs may be tracked within an AA map and persisted within the DEFS filesystem. An AA map may include the DEFS ID in an AA index. While AA ownership information regarding other DEFSs in the cluster may be cached in the AA map of a given DEFS, which may be useful during the PVBN free path, for example, to facilitate freeing of PVBNs of an AA not owned by the given DEFS (which may arise in situations in which partial AAs are donated from one DEFS to another), the authoritative source information regarding the AAs owned by a given DEFS may be presumed to be in the AA map of the given DEFS.

In support of avoiding storage silos and supporting the more fluid use of disk space across all nodes of a cluster, DEFSs may be allowed to donate partially or completely free AAs to other DEFSs.

Each DEFS may have its own label information kept in the file system. The label information may be kept in the super block or another well-known location outside of the file system.

In various examples, there can be multiple DEFSs on a RAID tree. That is, there may be a many-to-one association between DEFSs and a RAID tree, in which each DEFS may have a reference on the RAID tree. The RAID tree can still have multiple RAID groups. In various examples described herein, it is assumed the PVBN space provided by the RAID tree is continuous.

It may be helpful to have a root DEFS and a data DEFS that are transparent to other subsystems. These DEFSs may be useful for storing information that might be needed before the file system is brought online. Examples of such information may include controller (node) failover (CFO) and storage failover (SFO) properties/policies. HA is one example of where it might be helpful to bring up a controller (node) failover root DEFS first before giving back the storage failover data DEFSs. HA coordination of bringing down a given DEFS on takeover/giveback may be handled by the file system (e.g., WAFL) since the RAID tree would be up until the node is shutdown.

DEFS data structures (e.g., DEFS bit maps at the PVBN level, such as active maps and reference count (refcount) maps) may be sparse. That is, they may represent the entire global PVBN space, but only include valid truth values for PVBNs of AAs that are owned by the particular DEFS with which they are associated. When validation of these bit maps is performed by or on behalf of a particular DEFS, the bits should be validated only for the AA areas owned by the particular DEFS. When using such sparce data structures, to get the complete picture of the PVBN space, the data structures in all of the nodes should be taken into consideration. While various DEFS data structures may be discussed herein as if they were separate metafiles, it is to be appreciated, given the visibility by each node into the entire global PVBN space, one or more of such DEFS data structures may be represented as cluster-wide metafiles. Such a cluster-wide metafile may be persisted in a private inode space that is not accessible to end users and the relevant portions for a particular DEFS may be located based on the DEFS ID of the particular DEFS, for example, which may be associated with the appropriate inode (e.g., an L0 block). Similarly, the entirety of such a cluster-wide metafile may be accessible based on a cluster ID, for example, which may be associated with a higher-level inode in the hierarchy (e.g., an L1 block). In any event, each node should generally have all the information it needs to work independently until and unless it runs out of storage space or meets a predetermined or configurable threshold of a storage space metric (e.g., a free space metric or a used space metric), for example, relative to the other nodes of the cluster. At that point, as described further below, as part of a space monitoring and/or a space balancing process, the node may request a portion of AAs of DEFSs owned by one or more of such other nodes be donated so as to increase the useable storage space of one or more DEFSs of the node at issue.

Figure 6A:
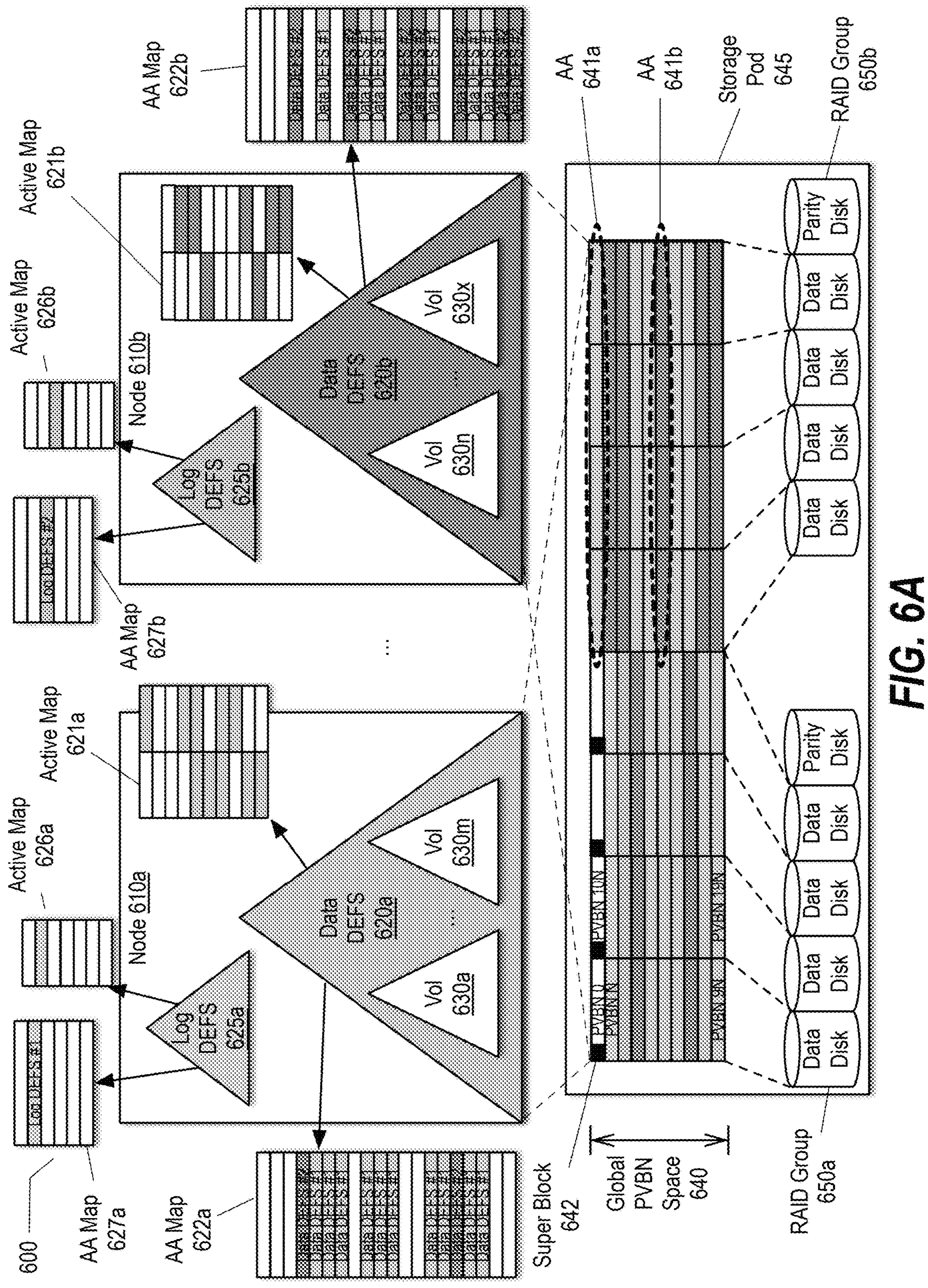
FIG. 6A is a block diagram illustrating a distributed storage system architecture that provides disaggregated storage in accordance with an embodiment of the present disclosure.

FIG. 6A is a block diagram illustrating a distributed storage system architecture 600 that provides disaggregated storage in accordance with an embodiment of the present disclosure. Various architectural advantages of the proposed distributed storage system architecture and mechanisms for providing and making use of disaggregated storage include, but are not limited to, the ability to perform automatic space balancing among DEFSs, perform elastic node growth and shrinkage for a cluster, perform elastic storage growth of the storage pod, perform zero-copy file and volume move (migration), perform distributed RAID rebuild, achieve HA cost reduction using volume rehosting, create remote clones, and perform global data deduplication.

In the context of the present example, the nodes (e.g., node 610*a* and 610*b*) of a cluster, which may represent a data pod or include multiple data pods, each include respective data dynamically extensible file systems (DEFSs) (e.g., data DEFS 620*a* and data DEFS 620*b*) and respective log DEFSs (e.g., log DEFS 625*a* and log DEFS 625*b*). In general, data DEFSs may be used for persisting data on behalf of clients (e.g., client 180), whereas log DEFSs may be used to maintain an operation log or journal of certain storage operations within the journaling storage media that have been performed since the last CP.

It should be noted that while for simplicity only two nodes, which may be configured as part of an HA pair for fault tolerance and nondisruptive operations, are shown in the illustrative cluster depicted in FIG. 6A, there may be one or more additional nodes in a given cluster. For example, there may be multiple HA pairs within a cluster (or a data pod of the cluster, which may represent a mechanism to limit the fault domain). As such, the description of this two-node cluster should be taken as illustrative only. Furthermore, while in some examples HA may be achieved by defining pairs of nodes within a cluster as HA partners (e.g., with one node designated as the primary node and the other designated as the secondary), in alternative examples any other node within a cluster may be allowed to step in after a failure of a given node without defining HA pairs.

As discussed above, one or more volumes (e.g., volumes 630*a-m* and volumes 630*n-x*) or LUNs (not shown) may be created by or on behalf of customers for hosting/storing their enterprise application data within respective DEFSs (e.g., data DEFSs 620*a* and 620*b*).

While additional data structures may be employed, in this example, each DEFS is shown being associated with respective AA maps (indexed by AA ID) and active maps (indexed by PVBN). For example, log DEFS 625*a* may utilize AA map 627*a* to track those of the AAs within a global PVBN space 640 of storage pod 645 (which may be analogous to storage pod 145) that are owned by log DEFS 625*a* and may utilize active map 626*a* to track at a PVBN level of granularity which of the PVBNs of its AAs are in use; log DEFS 625*b* may utilize AA map 627*b* to track those of the AAs within the global PVBN space 640 that are owned by log DEFS 625*b* and may utilize active map 626*b* to track at a PVBN level of granularity which of the PVBNs of its AAs are in use; data DEFS 620*a* may utilize AA map 622*a* to track those of the AAs within the global PVBN space 640 that are owned by data DEFS 620*a* and may utilize active map 621*a* to track at a PVBN level of granularity which of the PVBNs of its AAs are in use; and data DEFS 620*b* may utilize AA map 622*b* to track those of the AAs within the global PVBN space 640 that are owned by data DEFS 620*b* and may utilize active map 621*b* to track at a PVBN level of granularity which of the PVBNs of its AAs are in use.

In this example, each DEFS of a given node has visibility and accessibility into the entire global PVBN address space 640 and any AA (except for a predefined super block AA 642) within the global PVBN address space 640 may be assigned to any DEFS within the cluster. By extension, each node has visibility and accessibility into the entire global PVBN address space 640 via its DEFSs. As noted above, the respective AA maps of the DEFSs define which PVBNs to which the DEFSs have exclusive write access. AAs within the global PVBN space 640 shaded in light gray, such as AA 641*a*, can only be written to by node 610*a* as a result of their ownership by or assignment to data DEFS 620*a*. Similarly AAs within the global PVBN space 640 shaded in dark gray, such as AA 641*b*, can only be written to by node 610*b* as a result of their ownership by or assignment to data DEFS 620*b*.

Returning to super block 642, it is part of a super block AA (or super AA). In the context of FIG. 6A, the super AA is the first AA of the storage pod 645. The super AA is not assigned to any DEFS (as indicated by its lack of shading). The super AA may have an array of DEFS areas which are dedicated to each DEFS and can be indexed by a DEFS ID. The DEFS ID may start at index 1 and in the context of the present example includes four super block and four DEFS label blocks. The DEFS label can act as a RAID label for the DEFS and can be written out of a CP and can store information that needs to be kept outside of the file system. In a pairwise HA configuration, two super blocks and two DEFS label blocks may be used by the hosting node and the other two may be used by the partner node on takeover. Each of these special blocks may have their own separate stripes.

In the context of the present example, it is assumed after establishment of the disaggregated storage within the storage pod 645 and after the original assignment of ownership of AAs to data DEFS 620*a* and data DEFS 620*b*, some AAs have been transferred from data DEFS 620*a* to data DEFS 620*b* and/or some AAs have been transferred from data DEFS 620*b* to data DEFS 620*a*. As such, the different shades of grayscale of entries within the AA maps are intended to represent potential caching that may be performed regarding ownership of AAs owned by other DEFSs in the cluster. For example, assuming ownership of a partial AA has been transferred from data DEFS 620*a* to data DEFS 620*b* as part of an ownership change performed in support of space balancing, when data DEFS 620*a* would like to free a given PVBN (e.g., when the given PVBN is no longer referenced by data DEFS 620*a* a result of data deletion or otherwise), data DEFS 620*a* should send a request to free the PVBN to the new owner (in this case, data DEFS 620*b*). This is due to the fact that in various embodiments, only the current owner of a particular AA is allowed to perform any modify operations on the particular AA. Further explanation regarding space balancing and AA ownership change is provided below with reference to FIG. 9 and FIG. 10, respectively.

Those skilled in the art will appreciate disaggregation of the storage space as discussed herein can be leveraged for cost-effective scaling of infrastructure. For example, the disaggregated storage allows more applications to share the same underlying storage infrastructure. Given that each DEFS represents an independent file system, the use of multiple of such DEFSs combine to create a cluster-wide distributed file system since all of the DEFSs within a cluster share a global PVBN space (e.g., global PVBN space 640). This provides the unique ability to independently scale each independent DEFS as well as enables fault isolation and repair in a manner different from existing distributed file systems.

Figure 6B:
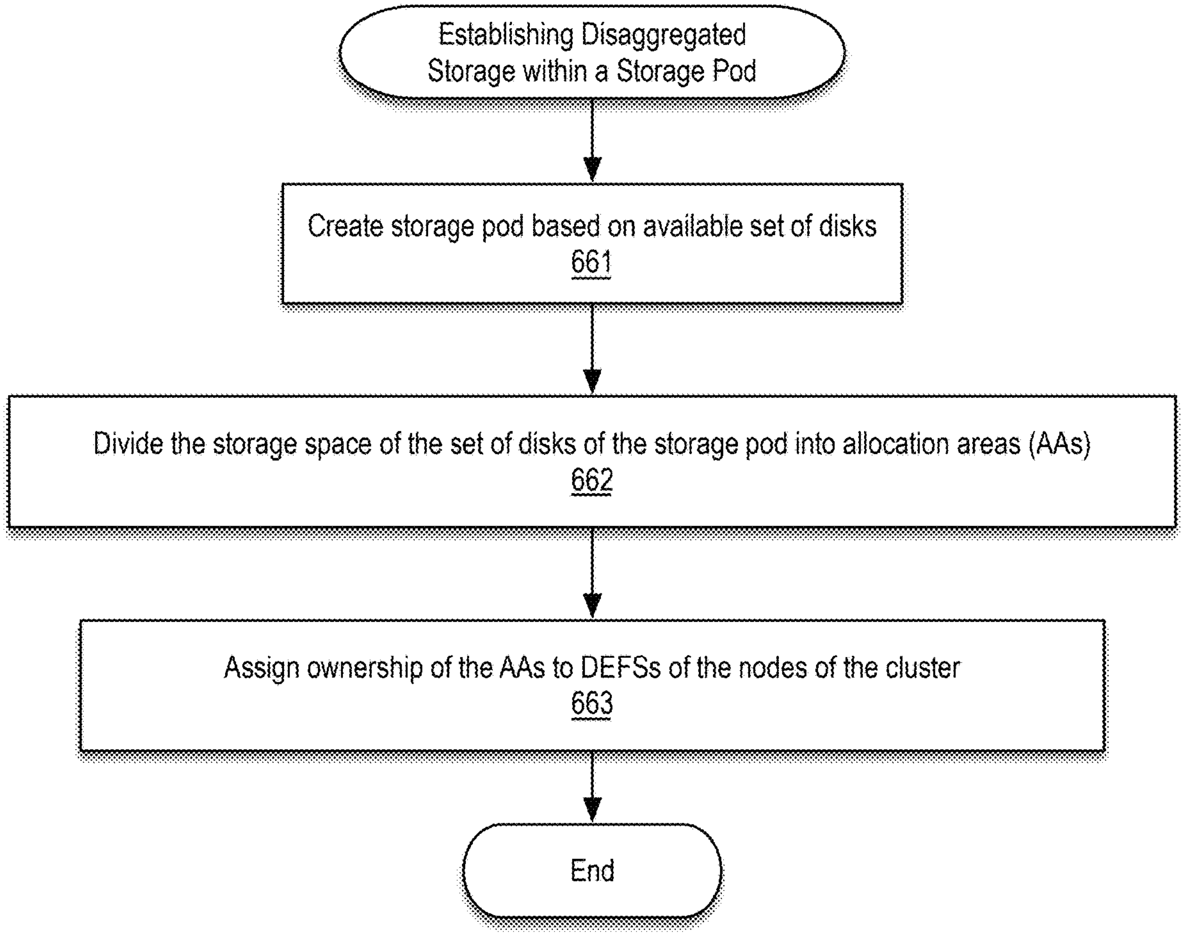
FIG. 6B is a high-level flow diagram illustrating operations for establishing disaggregated storage within a storage pod in accordance with an embodiment of the present disclosure.

Additional aspects of FIG. 6A will now be described in connection with a discussion of FIG. 6B, which represents a high-level flow diagram illustrating operations for establishing disaggregated storage within a storage pod (e.g., storage pod 645). The processing described with reference to FIG. 6B, may be performed by a combination of a file system (e.g., file system 360) and a RAID system (e.g., RAID system 380), for example, during or after an initial boot up.

At block 661, the storage pod is created based on a set of disks made available for use by the cluster. For example, job may be executed by a management plane of the cluster to create the storage pod and assign the disks to the cluster. Depending on the particular implementation and the deployment environment (e.g., on-prem versus cloud), the disks may be associated with of one or more disk arrays or one or more storage shelves or persistent storage in the form of cloud volumes provided by a cloud provider from a pool of storage devices within a cloud environment. For simplicity, cloud volumes may also be referred to herein as "disks." The disks may be HDDs or SSDs.

At block 662, the storage space of the set of disks may be divided or partitioned into uniform-sized AAs. The set of disks may be grouped to form multiple RAID groups (e.g., RAID group 650*a* and 650*b*) depending on the RAID level (e.g., RAID 4, RAID 5, or other). Multiple RAID stripes may then be grouped to form individual AAs. As noted above, an AA (e.g., AA 641*a* or AA 641*b*) may be a large chunk representing one or more GB of storage space and preferably accommodates multiple SSD erase blocks work of data. In one embodiment, the size of the AAs is tuned for the particular file system. The size of the AAs may also take into consideration a desire to reduce the need for performing space balancing so as to minimize the need for internode (e.g., East-West) communications/traffic. In some examples, the size of the AAs may be between about 1 GB to 10 GB. As can be seen in FIG. 6A, dividing the storage pod 645 into AAs allows available storage space associated with any given disk or any RAID group to be use across many/all nodes in the cluster without creating silos of space in each node. For example, at the granularity of an individual AA, available storage space within the storage pod 645 may be assigned to any given node in the cluster (e.g., by way of the given node's DEFS(s)). For example, in the context of FIG. 6A, AA 641*a* and the other AAs shaded in light gray are currently assigned to (or owned by) data DEFS 620*a* (which has a corresponding light gray shading). Similarly, AA 641*b* and the other AAs shaded in dark gray are currently assigned to (or owned by) data DEFS 620*b* (which has a corresponding light gray shading).

At block 663, ownership of the AAs is assigned to the DEFSs of the nodes of the cluster. According to one embodiment, an effort may be made to assign group of consecutive AAs to each DEFS. Initially, the distribution of storage space represented by the AAs assigned to each type of DEFS (e.g., data versus log) may be equal or roughly equal. Over time, based on differences in storage consumption by associated workloads, for example, due to differing write patterns, ownership of AAs may be transferred among the DEFSs accordingly.

As a result, of creating and distributing the disaggregated storage across a cluster in this manner, all disks and all RAID groups can theoretically to be accessed concurrently by all nodes and the issue discussed with reference to FIG. 5 in which the entirety of any given disk and the entirety of any given RAID group is owned by a single node is avoided.

Figure 7A:
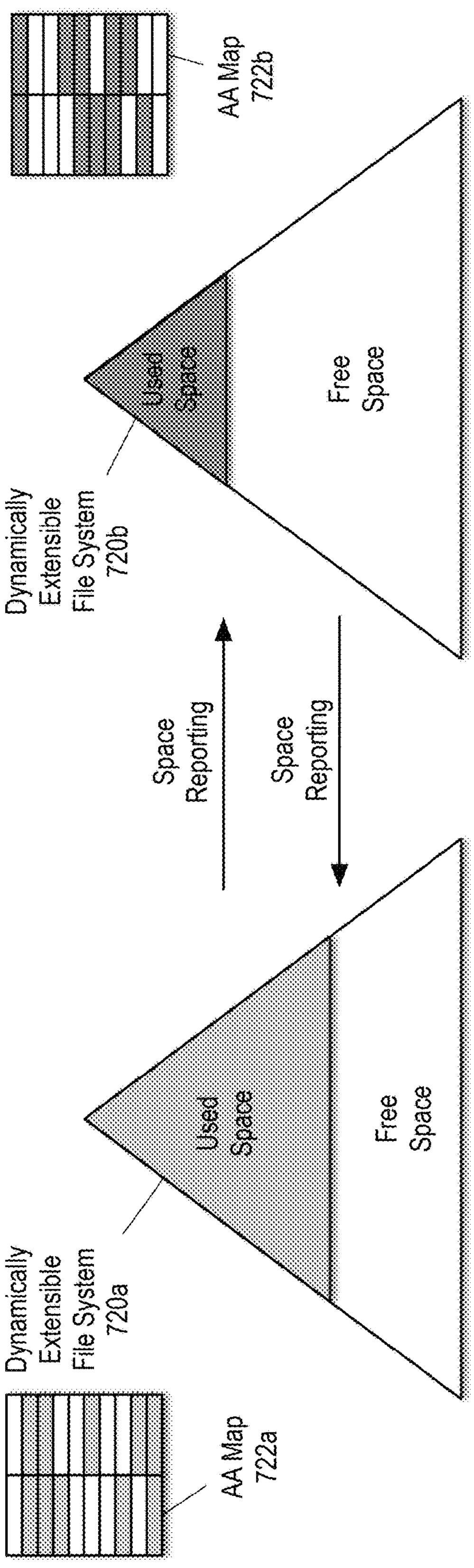
FIG. 7A is a block diagram illustrating two dynamically extensible file systems (DEFSs) prior to performance of automatic space balancing in accordance with an embodiment of the present disclosure.

Example Automatic Storage Space Balancing Among Dynamically Extensible File Systems FIG. 7A is a block diagram illustrating two dynamically extensible file systems (DEFSs) 720*a* and 720*b* prior to performance of automatic space balancing in accordance with an embodiment of the present disclosure. In one embodiment, each DEFS of a cluster may track a storage space metric (e.g., free space or used space) and may periodically broadcast a space report to all other nodes of the cluster. A non-limiting example of such space monitoring is described further below with reference to FIG. 8. As described further below with reference to FIG. 9, cluster-wide space reporting may be used to perform automatic space balancing so as to allow DEFSs running low on free space relative to other DEFSs in the cluster to receive free or partial AAs from one or more other DEFSs in the cluster.

In the context of the present example, DEFS 720*a* (which may be analogous to data DEFS 620*a*) is shown with a greater amount of used storage space and a lesser amount of free storage space than DEFS 720*b* (which may be analogous to data DEFS 620*b*). At this point in time, AA map 722*a* of DEFS 720*a* is shown with ten AA entries shaded in light gray, indicating it owns ten AAs, six of which may be used; and AA map 722*b* of DEFS 720*b* is shown with ten AA entries shaded in dark gray, indicating it owns ten AAs, only two of which may be used.

Based on cluster-wide space reporting, DEFS 720*a* may request a specified amount of storage space from all other nodes in the cluster. Assuming for sake of simplicity, DEFS 720*a* and DEFS 720*b* are part of a two-node cluster and are the only DEFSs in the cluster, the request for space made from the node owning DEFS 720*a* to the node owning DEFS 720*b* may attempt to create a more equal amount of free storage space available to each DEFS as shown in FIG. 7B.

While in the context of the present example, one specific type of space reporting is described via push communication (i.e., periodic broadcasting of space reports), it is to be appreciated other types of push communication approaches may be used. For example, DEFSs may perform space reporting responsive to a trigger event (e.g., a change in the storage space metric by a threshold since the last space report was sent). As yet another alternative, the storage space reporting may be via a pull communication approach, for example, in which nodes or DEFSs, periodically or responsive to a trigger event, poll the others for their respective storage space metrics.

Figure 7B:
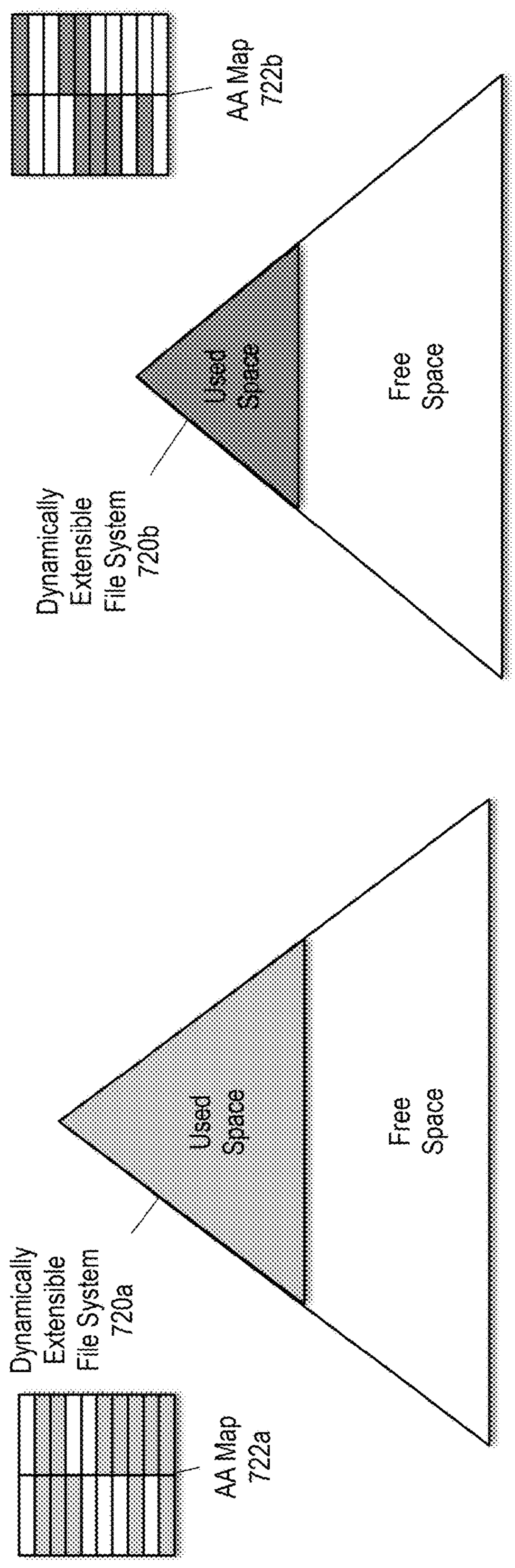
FIG. 7B is a block diagram illustrating the two dynamically extensible file systems (DEFSs) of FIG. 7A after completion of automatic space balancing in accordance with an embodiment of the present disclosure.

FIG. 7B is a block diagram illustrating the two dynamically extensible file systems (DEFSs) 720*a* and 720*b* of FIG. 7A after completion of automatic space balancing in accordance with an embodiment of the present disclosure. In this example, the size of the triangle representing DEFS 720*b* has shrunk to represent its total available storage space has been reduced as a result of donating one or more AAs to DEFS 720*a*. The size of triangle representing DEFS 720*a* has grown to represent its total available storage space has been increased. So the total used space of the DEFSs remains the same, but the amount of free space has been balanced. Assuming DEFS 720*a* requested two AAs worth of storage space from DEFS 720*b* and DEFS 720*b* accepted this request, it can now be seen (based on the change in AA maps) that upon completion of the automatic space balancing, DEFS 720*a* now owns twelve AAs and DEFS 720*b* now owns eight AAs and the free space available to both DEFSs is now more balanced.

Space Monitoring

Figure 8:
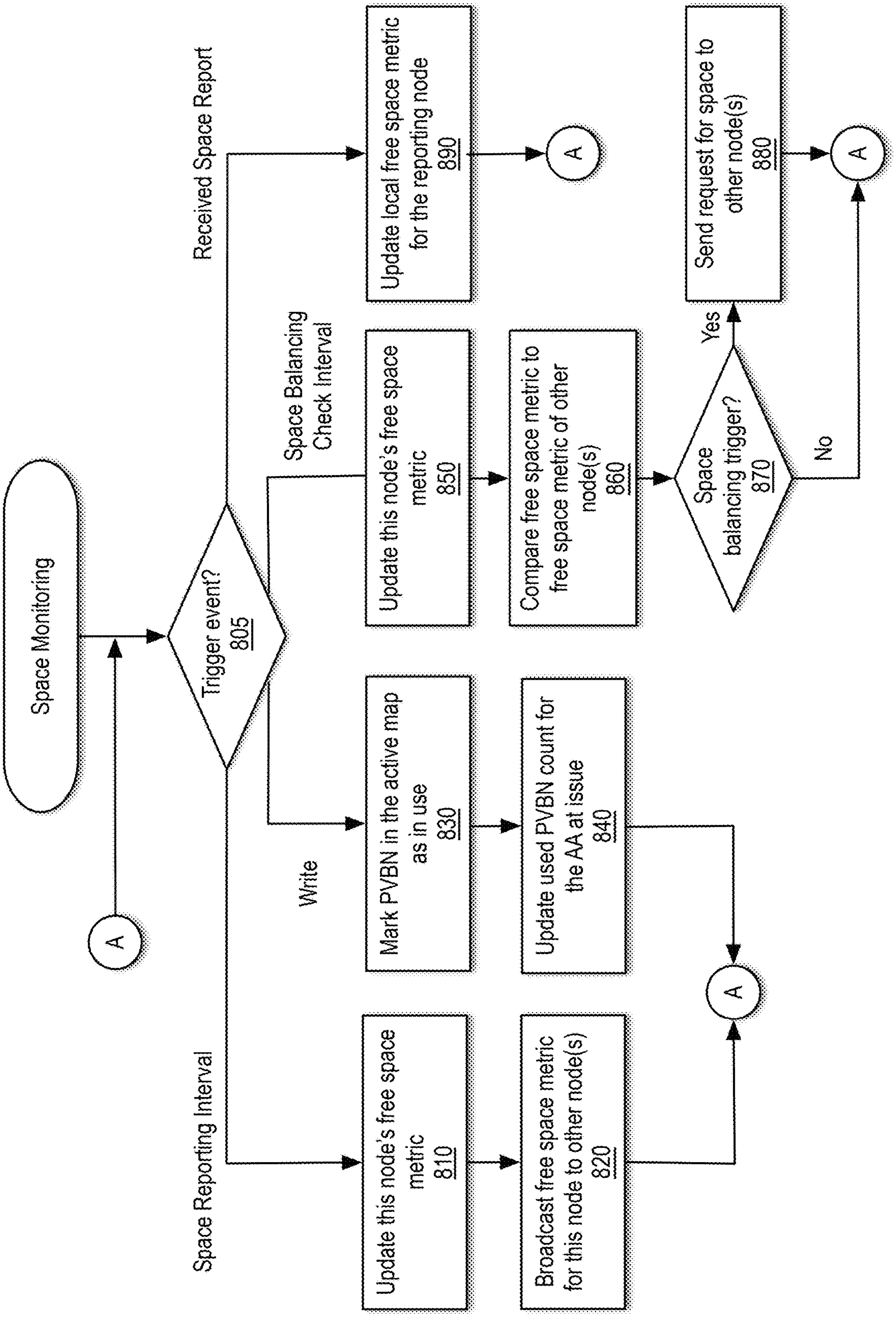
FIG. 8 is a flow diagram illustrating operations for performing space monitoring in accordance with an embodiment of the present disclosure.

FIG. 8 is a flow diagram illustrating operations for performing space monitoring in accordance with an embodiment of the present disclosure. The processing described with reference to FIG. 8 may be performed by a storage system (e.g., node 110*a*, 110*b*, 610*a*, or 610*b*) of a distributed storage system (e.g., cluster 100 or a cluster including nodes 610*a*, 610*b*, and possibly one or more other nodes).

At decision block 805, a determination is made regarding the trigger event that activated the space monitoring process. If the trigger event represents expiration of a timer representing a space reporting interval (which may be measured in minutes), processing continues with block 810. If the trigger event represents an indication that a write is being performed to a block within the PVBN space of the AAs owned by a DEFS of the node, the processing proceeds with block 830. If the trigger event represents expiration of a timer representing a space balancing check interval (which may be measured in minutes), processing continues with block 850. If the trigger event represents receipt of a space report from another node in the cluster, processing branches to block 890.

At block 810, the current node's free space metric is updated. For a given node, it's free space metric may be calculated by subtracting the total used PVBN space (e.g., the sum of PVBN counts for all AAs of all DEFSs of the node multiplied by the block size) for the node from the total useable space for all of its DEFSs. Assuming a given DEFS has N AAs, each of having Y PVBNs, the total usable space of the given DEFS may be calculated as N×Y×the block size.

In one embodiment, ownership information regarding DEFSs and nodes may be maintained within a configuration database (e.g., a replicated database (RDB)) accessible by all nodes, for example, stored on the boot media (e.g., boot disks) and maintained by a management plane of the cluster. The ownership information may include information regarding which DEFSs (e.g., as identified by their respective DEFS IDs) are owned by a given node (e.g., as identified by its node ID), for a given DEFS which node hosts it (or owns it). Additionally, nodes may maintain respective in-memory hash tables (e.g., a DEFS ownership hash table and an AA ownership hash table) to determine whether a given DEFS is owned by the node and whether a given AA is owned by a DEFS of the node.

At block 820, the node may contribute to cluster-wide space reporting by incorporating the node-level free space metric calculated in block 810 into a space report message and broadcasting the space report message to all other nodes of the cluster. After completion of the space reporting, processing loops back to decision block 805 to await the next trigger event.

At block 830, one or more corresponding PVBN entries within the DEFS's active map (e.g., one of active maps 621*a* or 622*a*) are updated, for example, during the write path to mark the PVBN(s) affected by the write operation as in use.

At block 840, a used (or in-use) PVBN count, indicative of how many PVBNs of the total number of PVBNs available to the DEFS within its total AA ownership PVBN space is updated. After completion of block 840, processing loops back to decision block 805 to await the next trigger event.

At block 850, the current node's free space metric is updated as described above with respect to block 810.

At block 860, the current node's free space metric may be compared to that of the other node(s) of the cluster (as reported by them, for example, on a periodic basis in accordance with the space reporting interval). According to one embodiment, an average amount of free space per node may be calculated. For example, the amount of free space cluster-wide (based on a sum of all the reported free space by all nodes in the cluster) may be determined and divided by the number of nodes in the cluster. This average amount of free space per node may then be compared to the current node's free space metric.

At decision block 870, it is determined whether the result of the comparison performed in block 860 should result in triggering of space balancing. If so, processing continues with block 880; otherwise, processing loops back to decision block 805 to away the next trigger event. In one embodiment, space balancing is triggered responsive to the average amount of free space per node exceeding the current nodes free space metric by a predetermined or configurable threshold.

While in the context of the present example, a free storage space metrics are used as a space balancing trigger, it is to be appreciated a used storage space metric may alternatively be used. Similarly, while the cluster-wide space reporting is described as being performed at the node-level in the context of the present example, it is to be appreciated such cluster-wide space reporting may alternatively be performed at the DEFS level.

Space Balancing

Figure 9:
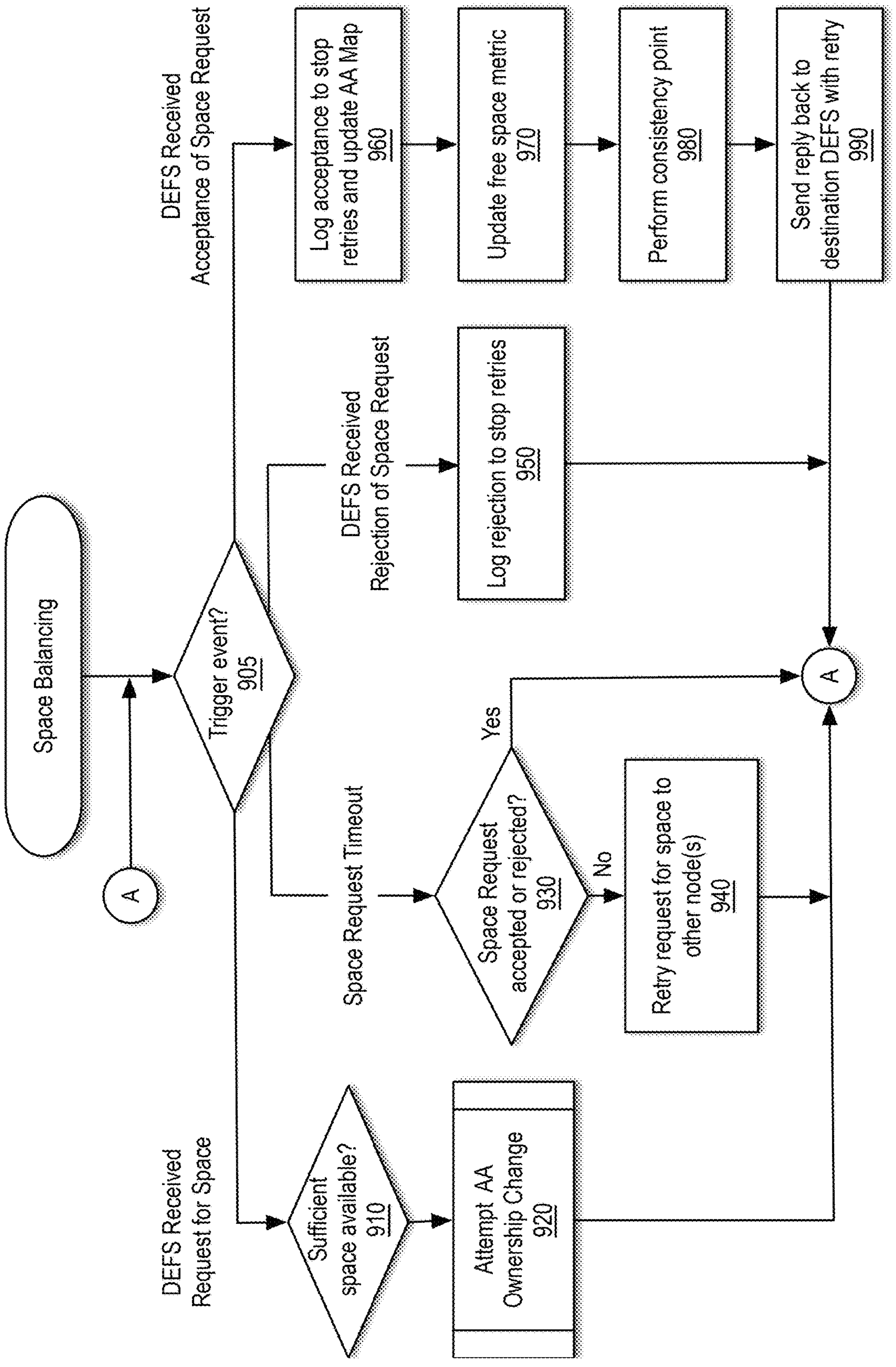
FIG. 9 is a flow diagram illustrating operations for performing space balancing in accordance with an embodiment of the present disclosure.

FIG. 9 is a flow diagram illustrating operations for performing space balancing in accordance with an embodiment of the present disclosure. The processing described with reference to FIG. 9 may be performed by a storage system (e.g., node 110*a*, 110*b*, 610*a*, or 610*b*) of a distributed storage system (e.g., cluster 100 or a cluster including nodes 610*a*, 610*b*, and possibly one or more other nodes).

At decision block 905, a determination is made regarding the trigger event that activated the space balancing process. If the trigger event represents receipt of a request for space, processing continues with decision block 910. If the trigger event represents expiration of a timer for a space request previously sent by the current DEFS, then processing continues with decision block 930. If the trigger event represents receipt of a rejection of a space request previously sent by the current DEFS, the processing continues with block 950. If the trigger event represents receipt of an acceptance of a space request previously sent by the current DEFS, the processing continues with block 960.

At decision block 910, it is determined whether sufficient space is available for the current DEFS to donate one or more of its AAs to the requester. If so, processing continues with block 920. According to one embodiment, as part of the determination regarding whether it has sufficient storage space available, the current DEFS may take into consideration how much of its storage space should be held in reserve for CP usage, for example, based on the write workload on the node that owns the current DEFS. Another consideration may be whether the DEFS has within a predetermined or configurable timeframe already donated one or more of its AAs to the current requester or to another requester.

At block 920, the current DEFS attempts to perform an AA ownership change of one or more of its AA from the current DEFS to the requester. In one embodiment, the current DEFS selects a number of its best owned AAs for the ownership change. In one embodiment, the "best" AAs may be selected by prioritizing the donation of free AAs over partial AAs as donation of partial AAs comes with the additional overhead of copying the associated bit maps or portions thereof (e.g., active map, AA info file, etc.). However, if an insufficient number of free AAs are available to meet the storage space needs of the requester as expressed by the received request for storage, the current DEFS may fulfill the request by selecting one or more partial AAs to be donated to the requester. Additionally, to support efficient performance of CPs, the current DEFS may also select for donation, those AAs that will not create a discontinuity or minimize discontinuities within a set of consecutive AAs. A non-limiting example of AA ownership change processing is described below with reference to FIG. 10. After completion of the AA ownership change processing, processing loops back to decision block 905 to await the next trigger event.

At decision block 930, it is determined whether the space request at issue previously made by the current DEFS has been accepted or rejected. If the space request was accepted or rejected by the source DEFS (the donor DEFS), which may be determined based on logging of receipt of such responses, then processing loops back to decision block 905 to await the next trigger event; otherwise, if no response has been received, then processing branches to block 940.

At block 940, the request for space may be retried. Those skilled in the art will be familiar with various retry mechanisms, including handling exceptions that might occur in re-processing the messages. For example, delayed queues and Dead-letter queues are two such data structures that can be used to implement a retry mechanism effectively. After completion of the retry, processing loops back to decision block 905 to await the next trigger event.

At block 950, the rejection of the space request is logged so as to stop retries. After completion of block 950, processing loops back to decision block 905 to await the next trigger event.

At block 960, the acceptance of the space request is logged to stop retries. In one embodiment, the acceptance may be in the form of an AA ownership change request message from the source (or donor) DEFS. An AA ownership change request message may include the AA IDs of the AAs. Based on the AA IDs contained in the AA ownership change request message, the current DEFS may update its AA map to reflect the fact that the current DEFS now owns the AAs donated by the source (or donor) DEFS.

At block 970, the current DEFS may update its free space metric to account for the new storage space available to it as a result of the newly owned AAs.

At block 980, the node may perform a consistency point to persist the updated AA data structures to disk.

At block 990, the current DEFS may send a reply back to the source (or donor) DEFS with retry to indicate acceptance of the AA ownership change request. After completion of block 990, processing loops back to decision block 905 to await the next trigger event.

Allocation Area Movement

Figure 10:
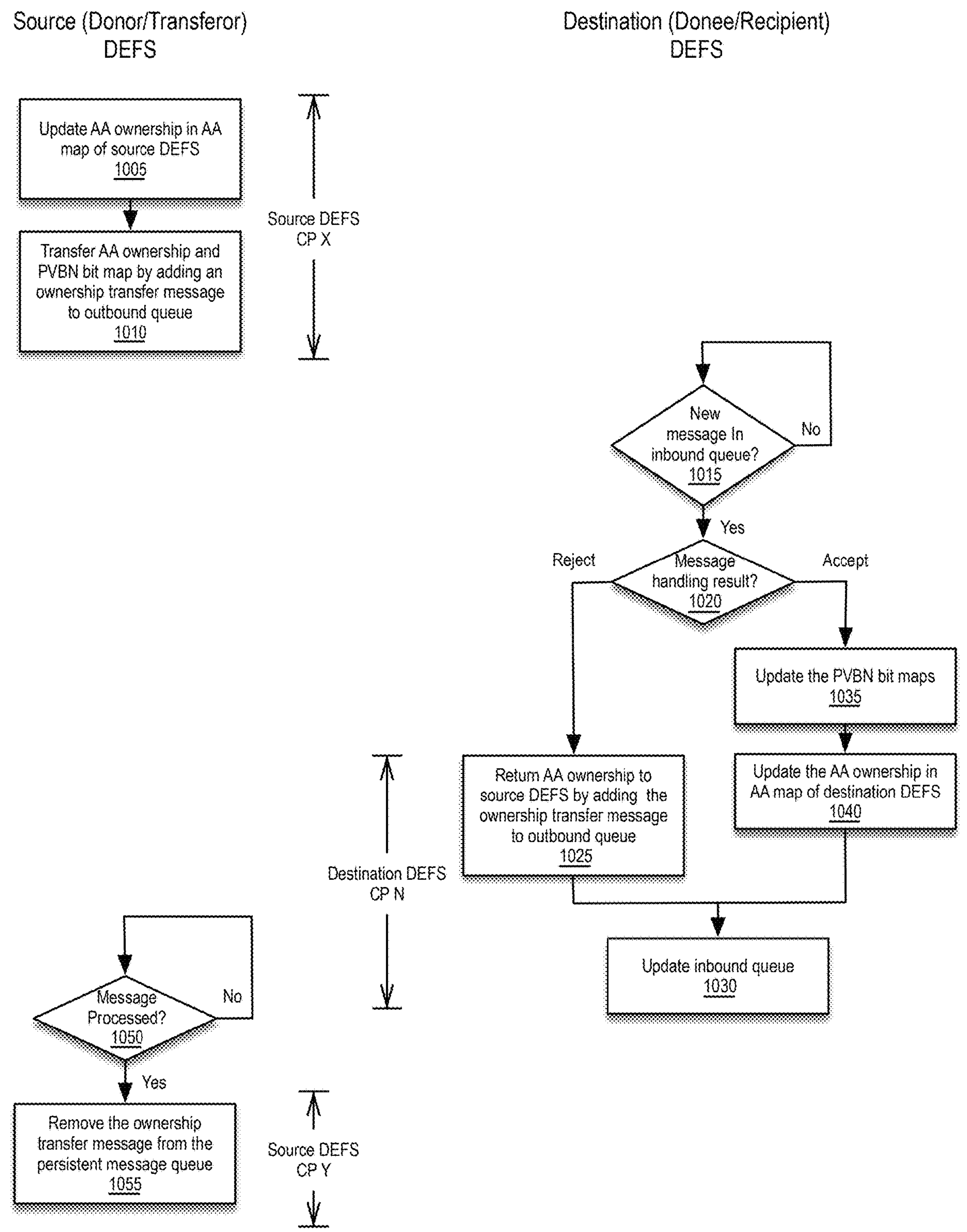
FIG. 10 is a flow diagram illustrating operations for attempting to perform allocation area ownership change in support of space balancing in accordance with an embodiment of the present disclosure.

FIG. 10 is a flow diagram illustrating operations for attempting to perform allocation area ownership change in support of space balancing in accordance with an embodiment of the present disclosure. The processing described with reference to FIG. 10 may be performed by a storage system (e.g., node 110*a*, 110*b*, 610*a*, or 610*b*) of a distributed storage system (e.g., cluster 100 or a cluster including nodes 610*a*, 610*b*, and possibly one or more other nodes). It is assumed prior to attempting to perform an AA ownership change from the source DEFS (which may also be referred to herein as the donor or transferor DEFS), one or more AAs (e.g., free AAs and/or partial AAs) have previously been selected that are to be donated or transferred to the destination (which may also be referred to herein as the donee or recipient DEFS).

At block 1005, the AA ownership of the selected AAs, for example, maintained in an AA ownership map (e.g., AA map 622*b* or 722*b*) maintained by the source DEFS (e.g., data DEFS 620*b* or 720*b*) is updated. For example, the AAs selected for transfer from the source DEFS to the destination DEFS (e.g., data DEFS 620*a* or 720*a*) may be removed from the AA map of the source DEFS and their respective AA IDs may be added to an ownership change or transfer message.

At block 1010, the AA ownership of the selected AAs and an associated PVBN bit map (e.g., active map 621*b*) are transferred from the source DEFS to the destination DEFS, for example, by adding the ownership change or transfer message to an outbound queue (e.g., an outbound persistent message queue associated with the source DEFS or the node hosting the source DEFS). During block 1005 or 1010, the associated PVBN bit map may also be frozen to temporarily preclude use of the PVBN bit map since the source DEFS no longer owns the selected AAs that are in the process of being transferred to the destination DEFS.

In the context of the present example, the ownership transfer is accomplished by way of a local update of AA ownership information and a persistent message added to a persistent message queue during the same CP (e.g., CP X) of the source DEFS. Depending on the particular implementation, copies of messages in outbound queues may be copied to the inbound queues of the intended recipients on a periodic basis or in response to a trigger event.

At decision block 1015, the destination DEFS determines whether there is a new message (e.g., the ownership change or transfer message generated by the source DEFS in blocks 1005 and/or 1010) in its inbound queue. If so, processing continues with decision block 1020; otherwise, processing loops back to decision block 1015. In one embodiment, a polling thread may be implemented for each inbound queue and may periodically check the inbound queue for the presence of a message on the inbound queue.

At decision block 1020, a message handling result is determined. If the ownership transfer of the AAs from the source DEFS is rejected by the destination DEFS, for example, as a result of a sufficient number of AAs already having been received from one or more other DEFSs of the cluster, then processing continues with block 1025; otherwise, if the ownership transfer of the AAs from the source DEFS is accepted by the destination DEFS, the processing branches to block 1035.

At block 1025, the ownership of the AAs is returned to the source DEFS, for example, by adding the ownership change or transfer message just received from the source DEFS to the outbound queue of the destination DEFS with the destination updated to reference the DEFS ID of the source DEFS.

At block 1030, the inbound queue of the destination DEFS is updated. For example, depending on the particular implementation of the persistent message queues, a head pointer for the inbound queue may be updated or a sequence number of the message may be updated (e.g., incremented).

At block 1035, the PVBN bit maps (e.g., active maps 621*a* and 621*b*) are updated. For example, those portions of the PVBN bit map of the source DEFS associated with the transferred AAs identified within the ownership transfer message may be moved or copied to the PVBN bit map of the destination DEFS. As should be appreciated the PVBN bit map associated with the AAs involved in the ownership transfer should not be used until ownership of the AAs identified by the ownership change or transfer message has been accepted and updated by the destination DEFS or rejected and re-assigned on the source DEFS. At that point, the PVBN bit map may be unfrozen to allow usage of the PVBN bit map to resume.

At block 1040, the AA ownership of the AAs being transferred to the destination DEFS is updated, for example, by updating an AA ownership map (e.g., AA map 622*a* or 722*a*) maintained by the destination DEFS.

In the context of the present example, the ownership transfer processing on the destination DEFS is performed by way of a local update of AA ownership information and updating of its inbound queue during the same CP (e.g., CP N) of the destination DEFS.

At decision block 1050, it is determined whether the ownership change or transfer message originated by the source DEFS has been processed. If so, processing continues with block 1055; otherwise, processing loops back to decision block 1050. In one embodiment, a polling thread may be implemented for each outbound queue. For example, the polling thread associated with the outbound queue of the source DEFS may periodically check the intended recipient's inbound queue (in this case, the inbound queue of the destination DEFS) for an indication that processing of a given message (in this case, the ownership change or transfer message) has been completed by the intended recipient. Depending on the particular persistent message queue implementation, the completion of the processing of the ownership change or transfer message may be detected, for example, based on observing an update to the head pointer of the inbound queue of the destination DEFS or based on observing a change to the sequence number of the message in the inbound queue of the destination DEFS.

At block 1055, the ownership change or transfer message is removed from the outbound persistent message queue of the source DEFS and another CP is taken (e.g., CP Y).

In the context of the present example, it is to be noted that AA movement (transfer of ownership) is made possible by moving one or more bit maps relating to PVBN ownership (e.g., active maps 621*a* or 621*b*) from one DEFS to another. Modification to a given AA map (e.g., AA map 622*a* or 622*b*) changes the ownership of the AA at issue; however, which PVBNs are still in use is identified and tracked by the PVBN bit maps (e.g., active map 621*a* or 621*b* and refcount maps) so moving part of such bit maps from one DEFS to another facilitates movement of partial AAs. In one embodiment, the movement of the PVBN bit maps along with the AA movement may be done in lock step with a CP so as to avoid loss of any data in the transfer.

Once a given AA is moved from one DEFS to another, freeing of PVBNs is collected and moved to the new owner DEFS to decrement the refcount. Since, in one embodiment, all the modify operations of AA data structure may only be performed by the DEFS that owns the AA at issue, there is no need for locking.

While in the context of the present example, a persistent message queue is assumed to be used to perform inter-node communications, it is to be understood on-wire transfers (e.g., network communications), for example, via RPCs may alternatively be used.

Removal of a Node

Figure 11:
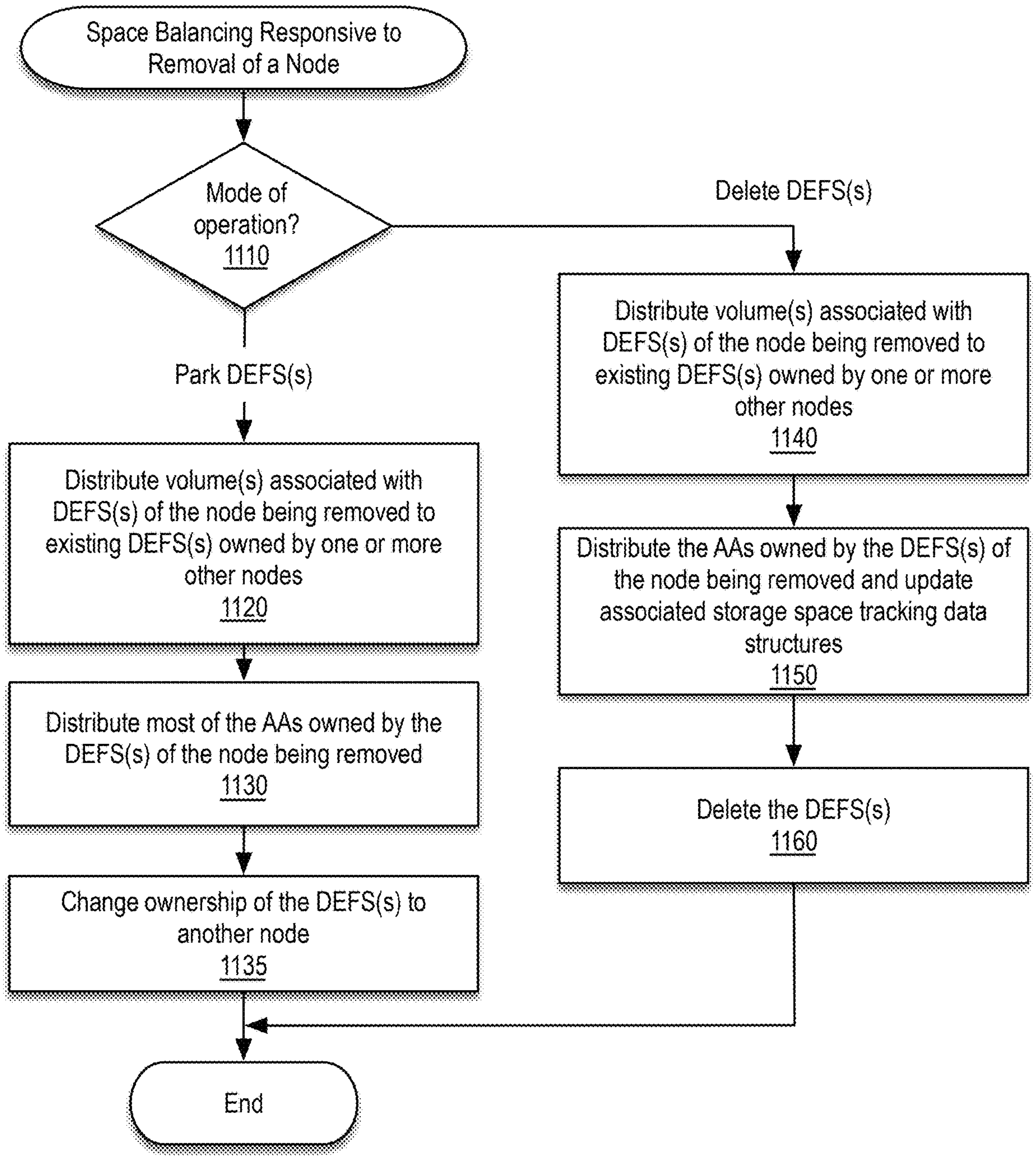
FIG. 11 is a flow diagram illustrating operations for performing space balancing responsive to removal of a node from a cluster in accordance with an embodiment of the present disclosure.

FIG. 11 is a flow diagram illustrating operations for performing space balancing responsive to removal of a node from a cluster in accordance with an embodiment of the present disclosure. The processing described with reference to FIG. 11 may be performed by the coordinated actions of the DEFS(s) (e.g., log DEFS 625*a* and data DEFS 620*a* or log DEFS 625*b* and data DEFS 620*b*) associated with the node (e.g., node 610*a* or 610*b*) to be removed, one or more other DEFSs within the cluster, the node to be removed, and the node(s) in the cluster hosting the one or more other DEFSs. In the context of the present example, it is assumed the cluster may operate in accordance with one or more modes of operation in connection with removal of a node. For example, the cluster may operate in a single, preset mode of operation involving parking one or more DEFSs owned by the node to be removed within another node of the cluster, a single, preset mode of operation involving deletion of the one or more DEFSs, or both modes of operation may be available and administrative input or configuration parameters associated with the cluster may select the mode of operation.

At decision block 1110, a determination is made regarding the mode of operation of the cluster. If the mode of operation relates to parking of the one or more DEFSs owned by the node to be removed within another node of the cluster, then processing continues with block 1120; otherwise, if the mode of operation relates to deletion of the one or more DEFSs, then processing branches to block 1140.

At block 1120, volume(s) (e.g., volumes 630*a-m* or volumes 630*n-x*) associated with the DEFS(s) of the node being removed are distributed to one or more other DEFSs in the cluster that are owned by one or more other nodes. According to one embodiment, the movement of a volume from one DEFS to another may be performed without copying the data stored within the volume. For example, a container file inode may be created on the destination DEFS and the top-most container file PVBN of the container file inode on the source DEFS may simply be moved to the new inode. Since all the PVBNs are accessible from all DEFSs in a cluster the just moving the top-most PVBN is good enough. This efficient volume movement may be referred to herein as "zero-copy volume move" or the like.

At block 1130, most of the AAs owned by the DEFS(s) of the node that is being removed are distributed to the one or more other node(s) of the cluster. This distribution of AAs may be performed via the AA ownership change mechanism described earlier, for example, with reference to FIGS. 9 and 10. In one embodiment, some small number of AAs may be maintained by the DEFS(s) to avoid certain complexities associated with attempting to transfer ownership of all AAs, including atomically updating the associated storage space information with the file system via a CP, which itself needs AAs to persist data to the storage pod (e.g., storage pod 645).

At block 1135, the DEFS(s) of the node that is being removed are parked within another node of the cluster by changing ownership of the DEFS(s) to the other node. In one embodiment, as the parked DEFS(s) still have a few AAs, they will remain online; however, as the data associated with the parked DEFS(s) is not expected to change, there should be no need for the parked DEFS(s) to go through CPs. The ownership of a given parked DEFS may be subsequently reassigned to yet another node, for example, responsive to a request by the other node to create a new DEFS. As such, parking a DEFS avoid the overhead associated with deleting the DEFS and may facilitate more efficient workflow associated with new DEFS creation.

At block 1140, volume(s) (e.g., volumes 630*a-m* or volumes 630*n-x*) associated with the DEFS(s) of the node being removed are distributed to one or more other DEFSs in the cluster that are owned by one or more other nodes as described above with reference to block 1120.

At block 1150, the AAs owned by the DEFS(s) of the node that is being removed are distributed to the one or more other node(s) of the cluster. This distribution of AAs may be performed as described above with reference to block 1130; however, since the DEFS(s) are to be deleted, the ownership of all AAs of the DEFS(s) at issue should be transferred, including atomically updating the associated storage space information with the file system via a CP.

At block 1160, the DEFS(s) of the node that is being removed can now be deleted.

Addition of a New Node

Figure 12:
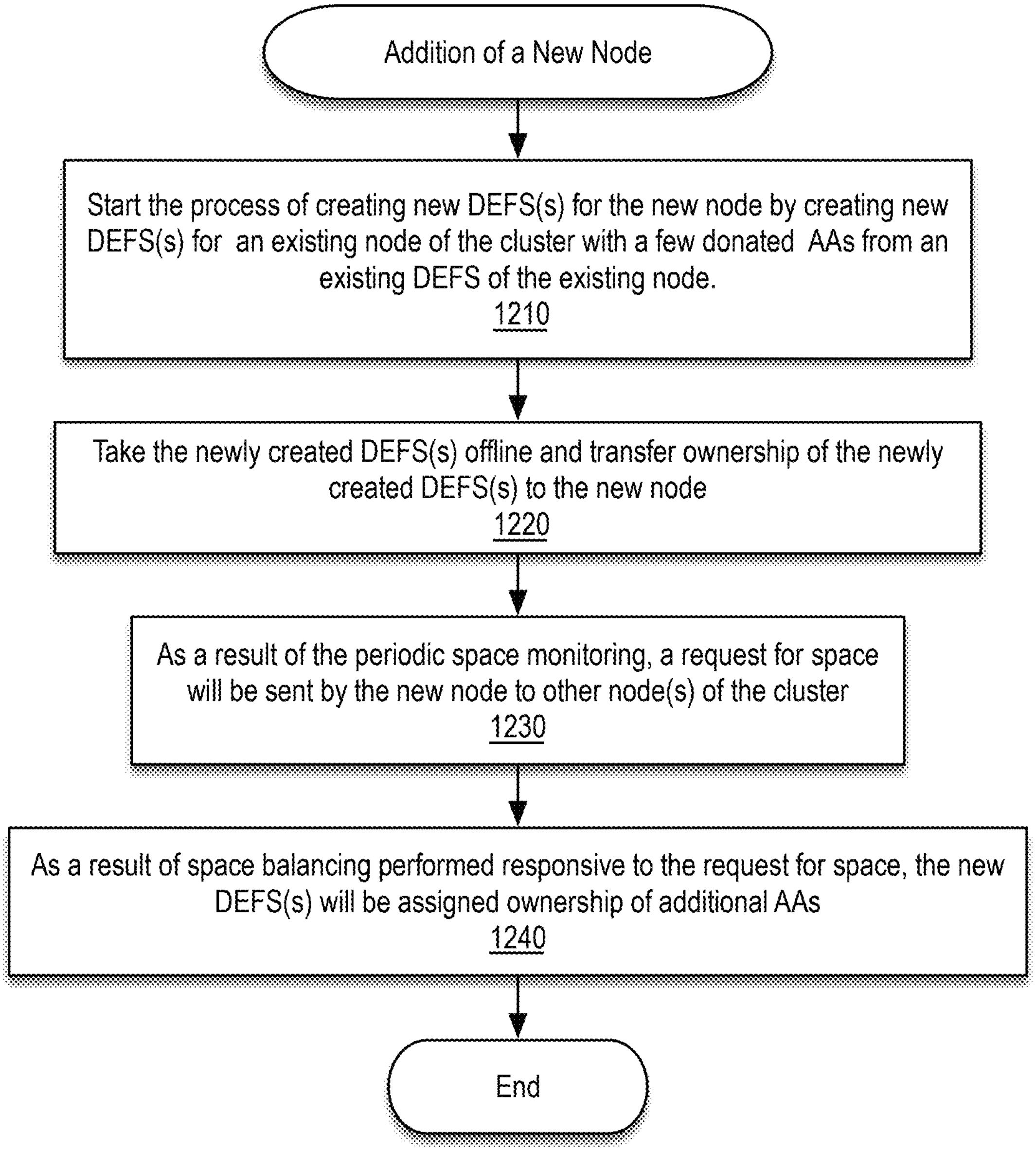
FIG. 12 is a flow diagram illustrating operations for performing space balancing responsive to addition of a new node to a cluster in accordance with an embodiment of the present disclosure.

FIG. 12 is a flow diagram illustrating operations for performing space balancing responsive to addition of a new node to a cluster in accordance with an embodiment of the present disclosure. The processing described with reference to FIG. 12 may be performed by the coordinated actions of the management plane of the cluster, an existing node (e.g., one of nodes 610*a* or 610*b*) of the cluster, and one of more DEFSs (e.g., log DEFS 625*a* and data DEFS 620*a* or log DEFS 625*b* and data DEFS 620*b*) associated with the existing nodes (e.g., node 610*a* or 610*b*), the newly added node, and the one or more new DEFSs of the new node. Prior to starting at block 1210, it is assumed a new storage system is available to be added to the cluster, for example, as a result of creating a new instance of a node within a cloud environment based on available resources (e.g., processing resources, such as one or more CPUs)

At block 1210, the process of creating one or more new DEFSs for the new node is started. In one embodiment, during a cluster join process, for example, performed by the management plane of the cluster to add the new node to the cluster, new DEFS IDs may be identified and assigned to the new DEFSs to be created for the new node. The new DEFS(s) may first be created on an existing node (e.g., node 610*a* or 610*b*) of the cluster with a few AAs donated from one or more existing DEFSs (e.g., log DEFS 625*a* and data DEFS 620*a* or log DEFS 625*b* and data DEFS 620*b*) owned by the existing node. As part of the creation of the new DEFS(s), new data structures (e.g., AA maps and other bit maps) may also be created for the new DEFS(s). In one embodiment, the default set of DEFSs for a new node includes at least one log DEFS and at least one data DEFS. Since the donated AAs are from one or more DEFSs on the same node (the existing node) as the node on which the new set of one or more DEFSs is being created, in one embodiment, the messaging-based or RPC-based approach described above in connection with performing AA ownership changes may be avoided and instead a file system message may be used to perform the desired AA ownership changes.

At block 1220, the newly created set of one or more DEFS(s) created on behalf of the new node by the existing node of the cluster are taken offline and the ownership of the new DEFS(s) is transferred to the new node.

After completion of block 1220, the new node has a set of one or more newly created DEFSs that each have a few AAs. At this point, additional AAs may be added to each of the one or more newly created DEFSs.

At block 1230, as a result of periodic space monitoring performed by all nodes and/or DEFSs of the cluster, for example, as described above with reference to FIG. 8, the new node will identify a need for more storage space on the part of its new DEFS(s) and issue request(s) for space to one or more other nodes of the cluster.

At block 1240, as a result of space balancing, for example, as described above with reference to FIG. 9, performed responsive to the request(s) for space issued in block 1230, the new DEFS(s) will be assigned ownership of additional AAs previously owned by one or more other DEFS(s) within the cluster.

Elastic node growth and shrinkage can facilitate implementation of a pay-as-you-go storage service delivery model. For example, when additional infrastructure resources are desired or existing infrastructure resources are no longer needed, they can easily be added or removed and the customer may be charged on the basis of their usage.

It is to be noted that, apart from adding a node to scale out (or horizontally scale) the cluster for purposes of handling storage operations, the incremental addition of nodes to a cluster may also be used for other data management operations or compute-intensive data services. For example, a dedicated server (or compute) node with an x86 or x64 instruction set architecture and one or more CPUs and/or one or more graphics processing units (GPUs), having a light-weight data adaptor (rather than the full storage operating system) to facilitate access to the storage pod via a backend storage network, may be added to a cluster to perform data services (sometimes described as Data-as-a-Service). The category of data services is quite broad. Data services can help with the aggregation of data from various parts of a storage architecture, or in the creation of a central data center repository. Data services may deal with data in transit, or with storage. Data services could also perform various types of analytics, including, for example, artificial-intelligence (AI)-powered data analytics, on big data sets. Data services may refer to various categories of software that facilitate access to data, and/or analysis of data. Non-limiting examples of data services include small, independent, and loosely coupled functions that enhance, organize, share, or calculate information collected and saved in data storage volumes. Data services may amplify traditional data by improving its resiliency, availability, and validity, as well as adding characteristics to data that it doesn't already have natively-like metadata. Non-limiting examples of data services include, but are not limited to performance of file system analytics and cataloging of user data assets. Additionally or alternatively, the incremental addition of nodes to a cluster may be used to support various compliance and/or security services (e.g., anti-ransomware and/or ransomware recovery) without impacting the core storage performance provided by the other nodes of the cluster running a full storage operating system.

While in the context of the flow diagrams of FIGS. 6B and 9-12 a number of enumerated blocks are included, it is to be understood that examples may include additional blocks before, after, and/or in between the enumerated blocks. Similarly, in some examples, one or more of the enumerated blocks may be omitted and/or performed in a different order.

Other Features

As will be appreciated by those skilled in the art based on the disclosure provided herein, the proposed approach for the creation and use of disaggregated storage allows many instances of microsystems or subsystems (e.g., file system journals, file system consistency points, etc.) of each DEFS to operate in parallel, which allows the entire file system to move forward and facilitates fault isolation to one DEFS (while other DEFSs can keep doing their jobs.

In one embodiment, the use of DEFSs in the manner described herein facilitates the transitioning of a copy-on-write file system (e.g., the WAFL file system) to a distributed file system, thereby allowing the various data management features (e.g., zero-copy snapshots, zero-copy clones, WAFL Iron, and the like) to operate at distributed scale.

More Effective Use of Larger Disks

A challenge that will be faced by all storage vendors in the new future is how to use large disks efficiently. Disk capacity and speed are growing much faster than CPU speeds. As of 2023, 100 TB SSDs are available. Today's use of node-level aggregates, as discussed above with reference to FIG. 5, limit the use of a RAID group by a single node (or HA pair). Attaching multi-petabytes (PBs) of storage to a node which does not have the CPU power to manage it all is not useful. DEFSs as described herein facilitate the use available space in a RAID group across many/all nodes in a cluster without creating silos of space in each node. This will help a storage operating system use space efficiently by having more CPU power across nodes. It also allows many more nodes to use their CPU power to perform activities like reparity for a single disk, distributed RAID rebuild, and the like, thereby also improving the resiliency of a distributed storage system.

Space Management Simplicity

As noted above, today administrative users of a distributed storage system may be required to monitor the storage space on each node-level aggregate and add disks or RAID groups to an aggregate even if there is space available on other nodes in the cluster. With DEFSs, the space is added to a new type of a common pool of disaggregated storage (a storage pod), which makes storage space available for any DEFS to consume making space management much simpler.

Scale Out

With a completely disaggregated architecture as described in various examples herein, the addition and removal of CPU power to a cluster may be accomplished by adding new DEFSs to the new nodes added to the cluster. The architecture proposed herein in which a disaggregated storage space is implemented also allows the growth and distribution of free space on a scale out system more uniformly.

Scale Up

To the extent the CPU count increases for individual nodes of a cluster, there will be a need to get more parallelization in connection with performing operations in the file system (e.g., file system 360) and other disk blade (e.g., disk blade 350) components. Such parallelism may be achieved by running multiple instance of a disk blade in a single node as all that is needed for running multiple instances of a disk blade are CPU, memory and disk. CPU and memory do not have persistence and can be easily redistributed. In a storage architecture, such as that described with reference to FIG. 5 in which volumes and node-level aggregates are associated with a certain disk today and cannot be easily moved without performing data copy, such scaling up presents a number of challenges. However, the use of DEFSs resolves some of the issues as a result of not associating the entire disk space with a single DEFS and allows fluid movement of volumes across DEFSs without data copy. If each disk blade is given a data DEFS and a root DEFS, the disk blade can run in parallel, thereby virtualizing the node.

Load Balancing

As DEFSs are able to see the entire PVBN space of a storage pod, which means they are able to read any PVBN directly from any disk associated with the storage pod, as noted above, this ability can be leveraged to perform zero-copy volume movement (without the need to copy data). Since, in one embodiment, each volume (e.g., flexible volume) represents a set of files in the volume directory of a DEFS, an example of a simple zero-copy volume move workflow would involve creating all the required inodes in the volume directory of the destination DEFS, pausing the traffic on the existing volume, and taking a final CP. At this point, the PVBN at the top of the inode tree for all the files in the source volume directory can simply be moved to the destination volume directory. Finally, the volume can be opened for business on the destination node. Subsequent writes to the volume will use AAs owned by the destination DEFS.

Load Sharing

Assume a workload like artificial intelligence (AI)/machine learning (ML) where the use of multiple nodes may be helpful to meet the throughput requirements from a single volume. With DEFSs, one or more remote clones of the volume can be created to allow the use of multiple nodes to meet the throughput requirements. Creating a remote clone is similar to the zero-copy volume move workflow, but to start a snapshot may be created on the parent volume. Next, the required volume files may be created and the top-most PVBN of the file tree may be moved to make the volume files available in the destination DEFS. At this point, the remote clone is open for business. If the load sharing is a long running operation, the snapshot may be released by doing a remote reference to the shared blocks.

HA Cost reduction

The use of a pairwise (2-way) HA model, limited to HA pairs, by some existing storage solutions limits each node to running at 50% CPU usage since after takeover the partner node has to take the load of both the nodes and will be at 100% CPU utilization. With DEFSs, even without N-way HA, after takeover one or more volumes associated with the partner node can be redistributed to one or more other nodes in the cluster. So, for example, if there were 4 nodes (representing 2 HA pairs) in a cluster, each HA pair each node would have the ability to run at 75% load since each node can take 25% load from the failed node. As the number of nodes increase, the percentage of CPU utilized in steady state can be reduced.

Scaling Internal Operations

Since the AAs are distributing across nodes any operations on a disk (e.g., a disk rebuild from parity) can be spread across multiple nodes and will not tax a single CPU.

Embodiments of the present disclosure include various steps, which have been described above. The steps may be performed by hardware components or may be embodied in machine-executable instructions, which may be used to cause one or more processing resources (e.g., one or more general-purpose or special-purpose processors) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors (e.g., processors 222*a*-*b*) within a single computer) and storage systems containing or having network access to computer program(s) coded in accordance with various methods described herein, and the method steps associated with embodiments of the present disclosure may be accomplished by modules, routines, subroutines, or subparts of a computer program product.

The term “storage media” as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device (e.g., local storage 230). Volatile media includes dynamic memory, such as main memory (e.g., memory 224). Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus (e.g., system bus 223). Transmission media can also take the form of acoustic or light waves, such as those generated during radio-wave and infra-red data communications.

Various forms of media may be involved in carrying one or more sequences of one or more instructions to the one or more processors for execution. For example, the instructions may initially be carried on a magnetic disk or solid state drive of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector can receive the data carried in the infra-red signal and appropriate circuitry can place the data on bus. Bus carries the data to main memory (e.g., memory 224), from which the one or more processors retrieve and execute the instructions. The instructions received by main memory may optionally be stored on storage device either before or after execution by the one or more processors.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:

providing a storage pod having a group of disks containing multiple Redundant Array of Independent Disks (RAID) groups, wherein storage space of the storage pod is accessible concurrently to all nodes of a plurality of nodes of a cluster, wherein the cluster represents a distributed storage system, and wherein the storage space is partitioned into a plurality of allocation areas (AAs), and wherein each AA of the plurality of AAs includes multiple RAID stripes of a given RAID group of the multiple RAID groups;

monitoring, by a node of the cluster, storage space availability or usage by one or more dynamically extensible file systems (DEFSs) of the node, wherein ownership of a given set of one or more AAs of the plurality of AAs is assigned to respective DEFSs of the plurality of nodes;

based on the storage space availability or usage meeting a predetermined or configurable threshold in relation to storage space availability or usage of one or more DEFSs of one or more other nodes of the plurality of nodes of the cluster, requesting ownership of one or more of the plurality of AAs currently owned by the one or more DEFSs of the one or more other nodes be transferred to a DEFS of the one or more DEFSs of the node.

2. The method of claim 1, wherein said requesting ownership includes sending a space request message from the node on behalf of a donee DEFS of the one or more DEFSs of the node to a donor DEFS of the one or more DEFSs of a second node of the one or more other nodes.

3. The method of claim 2, wherein the space request message is sent via an on-wire internode communication mechanism to the second node.

4. The method of claim 2, wherein the space request message is posted to a persistent message queue of the donor DEFS or the second node.

5. The method of claim 2, further comprising after receiving the space request message, selecting, by the donor DEFS, an AA to donate to the donee DEFS from among a plurality of AAs owned by the donor DEFS by prioritizing a free AA of the plurality of AAs owned by the donor DEFS over a partial AA of the plurality of AAs owned by the donor DEFS, wherein the free AA includes no blocks marked as used, and wherein the partial AA includes one or more blocks that are marked as used.

6. The method of claim 5, further comprising sending an AA ownership change message from the second node to the node, wherein the AA ownership change message includes an AA identifier of the selected AA.

7. A non-transitory machine readable medium storing instructions, which when executed by one or more processing resources of a distributed storage system, cause the distributed storage system to:

provide a storage pod having a group of disks containing multiple Redundant Array of Independent Disks (RAID) groups, wherein storage space of the storage pod is accessible concurrently to all nodes of a plurality of nodes of a cluster, wherein the cluster represents a distributed storage system, and wherein the storage space is partitioned into a plurality of allocation areas (AAs), and wherein each AA of the plurality of AAs includes multiple RAID stripes of a given RAID group of the multiple RAID groups;

monitor storage space availability or usage by one or more dynamically extensible file systems (DEFSs) of a node of the plurality of nodes, wherein ownership of a given set of one or more AAs of the plurality of AAs is assigned to respective DEFSs of the plurality of nodes;

based on the storage space availability or usage meeting a predetermined or configurable threshold in relation to storage space availability or usage of one or more DEFSs of one or more other nodes of the plurality of nodes of the cluster, requesting ownership of one or more of the plurality of AAs currently owned by the one or more DEFSs of the one or more other nodes be transferred to a DEFS of the one or more DEFSs of the node.

8. The non-transitory machine readable medium of claim 7, wherein requesting transfer of ownership includes sending a space request message from the node on behalf of a donee DEFS of the one or more DEFSs of the node to a donor DEFS of the one or more DEFSs of a second node of the one or more other nodes.

9. The non-transitory machine readable medium of claim 8, wherein the space request message is sent via an on-wire internode communication mechanism to the second node.

10. The non-transitory machine readable medium of claim 8, wherein the space request message is posted to a persistent message queue of the donor DEFS or the second node.

11. The non-transitory machine readable medium of claim 10, wherein the instructions further cause the distributed storage system to, after receipt of the space request message, select, by the donor DEFS, an AA to donate to the donee DEFS from among a plurality of AAs owned by the donor DEFS by prioritizing a free AA of the plurality of AAs owned by the donor DEFS over a partial AA of the plurality of AAs owned by the donor DEFS, wherein the free AA includes no blocks marked as used, and wherein the partial AA includes one or more blocks that are marked as used.

12. The non-transitory machine readable medium of claim 11, wherein the instructions further cause the distributed storage system to send an AA ownership change message from the second node to the node, wherein the AA ownership change message includes an AA identifier of the selected AA.

13. A distributed storage system comprising:

one or more processing resources; and instructions that when executed by the one or more processing resources cause the distributed storage system to:

provide a storage pod having a group of disks containing multiple Redundant Array of Independent Disks (RAID) groups, wherein storage space of the storage pod is accessible concurrently to all nodes of a plurality of nodes of a cluster, wherein the cluster represents a distributed storage system, and wherein the storage space is partitioned into a plurality of allocation areas (AAs), and wherein each AA of the plurality of AAs includes multiple RAID stripes of a given RAID group of the multiple RAID groups;

monitor storage space availability or usage by one or more dynamically extensible file systems (DEFSs) of a node of the plurality of nodes, wherein ownership of a given set of one or more AAs of the plurality of AAs is assigned to respective DEFSs of the plurality of nodes;

based on the storage space availability or usage meeting a predetermined or configurable threshold in relation to storage space availability or usage of one or more DEFSs of one or more other nodes of the plurality of nodes of the cluster, request ownership of one or more of the plurality of AAs currently owned by the one or more DEFSs of the one or more other nodes be transferred to a DEFS of the one or more DEFSs of the node.

14. The distributed storage system of claim 13, wherein requesting transfer of ownership includes sending a space request message from the node on behalf of a donee DEFS of the one or more DEFSs of the node to a donor DEFS of the one or more DEFSs of a second node of the one or more other nodes.

15. The distributed storage system of claim 14, wherein the space request message is sent via an on-wire internode communication mechanism to the second node.

16. The distributed storage system of claim 14, wherein the space request message is posted to a persistent message queue of the donor DEFS or the second node.

17. The distributed storage system of claim 14, wherein the instructions further cause the distributed storage system to, after receipt of the space request message, select, by the donor DEFS, an AA to donate to the donor DEFS from among a plurality of AAs owned by the donee DEFS by prioritizing a free AA of the plurality of AAs owned by the donor DEFS over a partial AA of the plurality of AAs owned by the donor DEFS, wherein the free AA includes no blocks marked as used, and wherein the partial AA includes one or more blocks that are marked as used.

18. The distributed storage system of claim 17, wherein the instructions further cause the distributed storage system to send an AA ownership change message from the second node to the node, wherein the AA ownership change message includes an AA identifier of the selected AA.

* * * * *